(12) United States Patent
Brooker et al.

(10) Patent No.: US 11,593,270 B1
(45) Date of Patent: Feb. 28, 2023

(54) FAST DISTRIBUTED CACHING USING ERASURE CODED OBJECT PARTS

(71) Applicant: Amazon Technologies, Inc., Seattle, WA (US)

(72) Inventors: Marc Brooker, Seattle, WA (US); Philip Daniel Piwonka, Seattle, WA (US); Nare Hayrapetyan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 17 days.

(21) Appl. No.: 17/105,233

(22) Filed: Nov. 25, 2020

(51) Int. Cl.
| | |
|---|---|
| *G06F 11/00* | (2006.01) |
| *G06F 12/0891* | (2016.01) |
| *G06F 16/22* | (2019.01) |
| *G06F 11/10* | (2006.01) |

(52) U.S. Cl.
CPC ........ *G06F 12/0891* (2013.01); *G06F 11/108* (2013.01); *G06F 11/1092* (2013.01); *G06F 16/2255* (2019.01)

(58) Field of Classification Search
CPC ............... G06F 11/1076; G06F 11/108; G06F 11/1088; G06F 11/1092; G06F 11/1096; G06F 16/2255; G06F 12/0891
See application file for complete search history.

(56) References Cited

U.S. PATENT DOCUMENTS

| | | | |
|---|---|---|---|
| 4,949,254 A | 8/1990 | Shorter | |
| 5,283,888 A | 2/1994 | Dao et al. | |
| 5,835,764 A | 11/1998 | Platt et al. | |
| 5,970,488 A | 10/1999 | Crowe et al. | |
| 5,983,197 A | 11/1999 | Enta | |
| 6,237,005 B1 | 5/2001 | Griffin | |
| 6,260,058 B1 | 7/2001 | Hoenninger et al. | |
| 6,385,636 B1 | 5/2002 | Suzuki | |

(Continued)

FOREIGN PATENT DOCUMENTS

| | | |
|---|---|---|
| CA | 2975522 A1 | 8/2016 |
| CN | 1341238 A | 3/2002 |

(Continued)

OTHER PUBLICATIONS

Huang, Cheng et al., Erasure Coding in Windows Azure Storage, 2012, USENIX (Year: 2012).*

(Continued)

*Primary Examiner* — Marc Duncan
(74) *Attorney, Agent, or Firm* — Knobbe, Martens, Olson & Bear, LLP

(57) ABSTRACT

Systems and methods are described for providing rapid access to data objects stored in a cache. Rather than storing data objects directly, each object can be broken into a number of parts via erasure coding, which enables the object to be generated from less than all parts. When servicing a request for the data object, a device can attempt to retrieve all parts, but begin to generate the data object as soon as a sufficient number of parts is retrieved, even if requests for other parts are outstanding. In this way, the data object can be retrieved without delay due to the slowest requests. For example, where one or more requests timeout, such as due to failure of cache devices, this timeout may have no effect on time required to retrieve the data object from the cache.

19 Claims, 9 Drawing Sheets

(56) References Cited

U.S. PATENT DOCUMENTS

| | | |
|---|---|---|
| 6,463,509 B1 | 10/2002 | Teoman et al. |
| 6,501,736 B1 | 12/2002 | Smolik et al. |
| 6,523,035 B1 | 2/2003 | Fleming et al. |
| 6,549,936 B1 | 4/2003 | Hirabayashi |
| 6,708,276 B1 | 3/2004 | Yarsa et al. |
| 7,036,121 B1 | 4/2006 | Casabona et al. |
| 7,308,463 B2 | 12/2007 | Taulbee et al. |
| 7,340,522 B1 | 3/2008 | Basu et al. |
| 7,360,215 B2 | 4/2008 | Kraiss et al. |
| 7,558,719 B1 | 7/2009 | Donlin |
| 7,577,722 B1 | 8/2009 | Khandekar et al. |
| 7,590,806 B2 | 9/2009 | Harris et al. |
| 7,640,574 B1 | 12/2009 | Kim et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,831,464 B1 | 11/2010 | Nichols et al. |
| 7,870,153 B2 | 1/2011 | Croft et al. |
| 7,886,021 B2 | 2/2011 | Scheitler et al. |
| 7,949,677 B2 | 5/2011 | Croft et al. |
| 7,954,150 B2 | 5/2011 | Croft et al. |
| 8,010,679 B2 | 8/2011 | Low et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVai et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,201,026 B1 | 6/2012 | Bornstein et al. |
| 8,209,695 B1 | 6/2012 | Pruyne et al. |
| 8,219,987 B1 | 7/2012 | Vlaovic et al. |
| 8,296,267 B2 | 10/2012 | Cahill et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,392,558 B1 | 3/2013 | Ahuja et al. |
| 8,402,514 B1 | 3/2013 | Thompson et al. |
| 8,417,723 B1 | 4/2013 | Lissack et al. |
| 8,429,282 B1 | 4/2013 | Ahuja |
| 8,448,165 B1 | 5/2013 | Conover |
| 8,479,195 B2 | 7/2013 | Adams et al. |
| 8,490,088 B2 | 7/2013 | Tang |
| 8,555,281 B1 | 10/2013 | Van Dijk et al. |
| 8,560,699 B1 | 10/2013 | Theimer et al. |
| 8,566,835 B2 | 10/2013 | Wang et al. |
| 8,601,323 B2 | 12/2013 | Tsantilis |
| 8,613,070 B1 | 12/2013 | Borzycki et al. |
| 8,615,589 B1 | 12/2013 | Adogla et al. |
| 8,631,130 B2 | 1/2014 | Jackson |
| 8,667,471 B2 | 3/2014 | Wintergerst et al. |
| 8,677,359 B1 | 3/2014 | Cavage et al. |
| 8,694,996 B2 | 4/2014 | Cawlfield et al. |
| 8,700,768 B2 | 4/2014 | Benari |
| 8,713,093 B1 | 4/2014 | Upadhyay et al. |
| 8,719,415 B1 | 5/2014 | Sirota et al. |
| 8,725,702 B1 | 5/2014 | Raman et al. |
| 8,756,322 B1 | 6/2014 | Lynch |
| 8,756,696 B1 | 6/2014 | Miller |
| 8,763,091 B1 | 6/2014 | Singh et al. |
| 8,769,519 B2 | 7/2014 | Leitman et al. |
| 8,793,676 B2 | 7/2014 | Quinn et al. |
| 8,799,236 B1 | 8/2014 | Azari et al. |
| 8,799,879 B2 | 8/2014 | Wright et al. |
| 8,806,266 B1 | 8/2014 | Qu et al. |
| 8,806,468 B2 | 8/2014 | Meijer et al. |
| 8,806,644 B1 | 8/2014 | McCorkendale et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,869,300 B2 | 10/2014 | Singh et al. |
| 8,874,952 B2 | 10/2014 | Tameshige et al. |
| 8,904,008 B2 | 12/2014 | Calder et al. |
| 8,949,457 B1 | 2/2015 | Theroux et al. |
| 8,966,495 B2 | 2/2015 | Kulkarni |
| 8,972,980 B2 | 3/2015 | Banga et al. |
| 8,990,807 B2 | 3/2015 | Wu et al. |
| 8,997,093 B2 | 3/2015 | Dimitrov |
| 9,002,871 B2 | 4/2015 | Bulkowski et al. |
| 9,021,501 B2 | 4/2015 | Li et al. |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,086,924 B2 | 7/2015 | Barsness et al. |
| 9,092,837 B2 | 7/2015 | Bala et al. |
| 9,098,528 B2 | 8/2015 | Wang |
| 9,104,477 B2 | 8/2015 | Kodialam et al. |
| 9,110,732 B2 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,116,733 B2 | 8/2015 | Banga et al. |
| 9,141,410 B2 | 9/2015 | Leafe et al. |
| 9,146,764 B1 | 9/2015 | Wagner |
| 9,152,406 B2 | 10/2015 | De et al. |
| 9,154,955 B1 | 10/2015 | Bertz et al. |
| 9,164,754 B1 | 10/2015 | Pohlack |
| 9,176,871 B1 | 11/2015 | Serlet |
| 9,183,019 B2 | 11/2015 | Kruglick |
| 9,189,778 B1 | 11/2015 | Sh. Al-Rashidi |
| 9,195,520 B2 | 11/2015 | Turk |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,405,582 B2 | 8/2016 | Fuller et al. |
| 9,411,645 B1 | 8/2016 | Duan et al. |
| 9,413,626 B2 | 8/2016 | Reque et al. |
| 9,417,918 B2 | 8/2016 | Chin et al. |
| 9,430,290 B1 | 8/2016 | Gupta et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,471,776 B2 | 10/2016 | Gu et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,563,613 B1 | 2/2017 | Dinkel et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |
| 9,626,204 B1 | 4/2017 | Banga et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |

(56) References Cited

U.S. PATENT DOCUMENTS

| | | |
|---|---|---|
| 9,703,681 B2 | 7/2017 | Taylor et al. |
| 9,715,402 B2 | 7/2017 | Wagner et al. |
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,798,831 B2 | 10/2017 | Chattopadhyay et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,002,036 B2 | 6/2018 | Fuchs et al. |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,191,861 B1 | 1/2019 | Steinberg |
| 10,193,839 B2 | 1/2019 | Tandon et al. |
| 10,198,298 B2 | 2/2019 | Bishop et al. |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,282,229 B2 | 5/2019 | Wagner et al. |
| 10,303,492 B1 | 5/2019 | Wagner et al. |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,552,442 B1 | 2/2020 | Lusk et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,608,973 B2 | 3/2020 | Kuo et al. |
| 10,615,984 B1 | 4/2020 | Wang |
| 10,623,476 B2 | 4/2020 | Thompson |
| 10,637,817 B2 | 4/2020 | Kuo et al. |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,652,350 B2 * | 5/2020 | Wozniak ............. G06F 12/0868 |
| 10,686,605 B2 | 6/2020 | Chhabra et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,732,951 B2 | 8/2020 | Jayanthi et al. |
| 10,733,085 B1 | 8/2020 | Wagner |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,824,484 B2 | 11/2020 | Wagner et al. |
| 10,831,898 B1 | 11/2020 | Wagner |
| 10,846,117 B1 | 11/2020 | Steinberg |
| 10,853,112 B2 | 12/2020 | Wagner et al. |
| 10,853,115 B2 | 12/2020 | Mullen et al. |
| 10,884,722 B2 | 1/2021 | Brooker et al. |
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 10,942,795 B1 | 3/2021 | Yanacek et al. |
| 10,949,237 B2 | 3/2021 | Piwonka et al. |
| 10,956,185 B2 | 3/2021 | Wagner |
| 11,010,188 B1 | 5/2021 | Brooker et al. |
| 11,016,815 B2 | 5/2021 | Wisniewski et al. |
| 11,099,870 B1 | 8/2021 | Brooker et al. |
| 11,099,917 B2 | 8/2021 | Hussels et al. |
| 11,115,404 B2 | 9/2021 | Siefker et al. |
| 11,119,809 B1 | 9/2021 | Brooker et al. |
| 11,119,813 B1 | 9/2021 | Kasaragod |
| 11,119,826 B2 | 9/2021 | Yanacek et al. |
| 11,126,469 B2 | 9/2021 | Reque et al. |
| 11,132,213 B1 | 9/2021 | Wagner et al. |
| 11,146,569 B1 | 10/2021 | Brooker et al. |
| 11,159,528 B2 | 10/2021 | Siefker et al. |
| 11,188,391 B1 | 11/2021 | Sule |
| 11,190,609 B2 | 11/2021 | Siefker et al. |
| 11,231,955 B1 | 1/2022 | Shahane et al. |
| 11,243,819 B1 | 2/2022 | Wagner |
| 11,243,953 B2 | 2/2022 | Wagner et al. |
| 11,263,034 B2 | 3/2022 | Wagner et al. |
| 11,354,169 B2 | 6/2022 | Marriner et al. |
| 11,360,793 B2 | 6/2022 | Wagner et al. |
| 11,392,497 B1 | 7/2022 | Brooker et al. |
| 11,461,124 B2 | 10/2022 | Wagner et al. |
| 2001/0044817 A1 | 11/2001 | Asano et al. |
| 2002/0083012 A1 | 6/2002 | Bush et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0149801 A1 | 8/2003 | Kushnirskiy |
| 2003/0177186 A1 | 9/2003 | Goodman et al. |
| 2003/0191795 A1 | 10/2003 | Bernardin et al. |
| 2003/0208569 A1 | 11/2003 | O'Brien et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |

(56) References Cited

U.S. PATENT DOCUMENTS

| | | |
|---|---|---|
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2005/0262183 A1 | 11/2005 | Colrain et al. |
| 2005/0262512 A1 | 11/2005 | Schmidt et al. |
| 2006/0010440 A1 | 1/2006 | Anderson et al. |
| 2006/0015740 A1 | 1/2006 | Kramer |
| 2006/0031448 A1 | 2/2006 | Chu et al. |
| 2006/0036941 A1 | 2/2006 | Neil |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0242709 A1 | 10/2006 | Seinfeld et al. |
| 2006/0248195 A1 | 11/2006 | Toumura et al. |
| 2006/0259763 A1 | 11/2006 | Cooperstein et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0067321 A1 | 3/2007 | Bissett et al. |
| 2007/0076244 A1 | 4/2007 | Suzuki et al. |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2007/0300297 A1 | 12/2007 | Dawson et al. |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0178278 A1 | 7/2008 | Grinstein et al. |
| 2008/0184340 A1 | 7/2008 | Nakamura et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2008/0244547 A1 | 10/2008 | Wintergerst et al. |
| 2008/0288940 A1 | 11/2008 | Adams et al. |
| 2008/0307098 A1 | 12/2008 | Kelly |
| 2009/0006897 A1 | 1/2009 | Sarsfield |
| 2009/0013153 A1 | 1/2009 | Hilton |
| 2009/0018892 A1 | 1/2009 | Grey et al. |
| 2009/0025009 A1 | 1/2009 | Brunswig et al. |
| 2009/0005581 A1 | 2/2009 | Kondur |
| 2009/0034537 A1 | 2/2009 | Colrain et al. |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheitler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2009/0307430 A1 | 12/2009 | Bruening et al. |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1 | 2/2010 | DeSantis et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0146004 A1 | 6/2010 | Sim-Tang |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0298011 A1 | 11/2010 | Pelley et al. |
| 2010/0299541 A1 | 11/2010 | Ishikawa et al. |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0004687 A1 | 1/2011 | Takemura |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0035785 A1 | 2/2011 | Mihara |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0208866 A1 | 8/2011 | Marmolejo-Meillon et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |

(56) References Cited

U.S. PATENT DOCUMENTS

| | | |
|---|---|---|
| 2011/0258603 A1 | 10/2011 | Wisnovsky et al. |
| 2011/0265067 A1 | 10/2011 | Schulte et al. |
| 2011/0265069 A1 | 10/2011 | Fee et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0060207 A1 | 3/2012 | Mardikar et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0110603 A1 | 5/2012 | Kaneko et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0173709 A1 | 7/2012 | Li et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0254193 A1 | 10/2012 | Chattopadhyay et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0145354 A1 | 6/2013 | Bruening et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0205114 A1 | 8/2013 | Badam et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0332660 A1 | 12/2013 | Talagala et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0047437 A1 | 2/2014 | Wu et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0164551 A1* | 6/2014 | Resch ............... H04L 9/0894 709/213 |
| 2014/0173614 A1 | 6/2014 | Konik et al. |
| 2014/0173616 A1 | 6/2014 | Bird et al. |

(56) References Cited

U.S. PATENT DOCUMENTS

| | | |
|---|---|---|
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0229942 A1 | 8/2014 | Wiseman et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0330936 A1 | 11/2014 | Factor et al. |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0351674 A1* | 11/2014 | Grube ............... H04L 67/1097 714/764 |
| 2014/0359093 A1 | 12/2014 | Raju et al. |
| 2014/0359608 A1 | 12/2014 | Tsirkin et al. |
| 2014/0365781 A1 | 12/2014 | Dmitrienko et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0046971 A1 | 2/2015 | Huh et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0146716 A1 | 5/2015 | Olivier et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178019 A1 | 6/2015 | Hegdal et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256514 A1 | 9/2015 | Laivand et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0271280 A1 | 9/2015 | Zhang et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0319174 A1 | 11/2015 | Hayton et al. |
| 2015/0324174 A1 | 11/2015 | Bromley et al. |
| 2015/0324182 A1 | 11/2015 | Barros et al. |
| 2015/0324210 A1 | 11/2015 | Carlson |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0021112 A1 | 1/2016 | Katieb |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0077901 A1 | 3/2016 | Roth et al. |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1 | 4/2016 | Susarla et al. |
| 2016/0119289 A1 | 4/2016 | Jain et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0188367 A1 | 6/2016 | Zeng |
| 2016/0191420 A1 | 6/2016 | Nagarajan et al. |
| 2016/0198235 A1 | 7/2016 | Liu et al. |
| 2016/0203219 A1 | 7/2016 | Hoch et al. |
| 2016/0212007 A1 | 7/2016 | Alatorre et al. |
| 2016/0226955 A1 | 8/2016 | Moorthi et al. |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0315910 A1 | 10/2016 | Kaufman |
| 2016/0350099 A1 | 12/2016 | Suparna et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0032000 A1 | 2/2017 | Sharma et al. |
| 2017/0041144 A1 | 2/2017 | Krapf et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |

(56) References Cited

U.S. PATENT DOCUMENTS

| | | |
|---|---|---|
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biruduraju |
| 2017/0085591 A1 | 3/2017 | Ganda et al. |
| 2017/0091235 A1 | 3/2017 | Yammine et al. |
| 2017/0091296 A1 | 3/2017 | Beard et al. |
| 2017/0093684 A1 | 3/2017 | Jayaraman et al. |
| 2017/0093920 A1 | 3/2017 | Ducatel et al. |
| 2017/0134519 A1 | 5/2017 | Chen et al. |
| 2017/0142099 A1 | 5/2017 | Hinohara et al. |
| 2017/0147656 A1 | 5/2017 | Choudhary et al. |
| 2017/0149740 A1 | 5/2017 | Mansour et al. |
| 2017/0153965 A1 | 6/2017 | Nitta et al. |
| 2017/0161059 A1 | 6/2017 | Wood et al. |
| 2017/0177266 A1* | 6/2017 | Doerner .......... G06F 3/0689 |
| 2017/0177441 A1 | 6/2017 | Chow |
| 2017/0177854 A1 | 6/2017 | Gligor et al. |
| 2017/0188213 A1 | 6/2017 | Nirantar et al. |
| 2017/0221000 A1 | 8/2017 | Anand |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286187 A1 | 10/2017 | Chen et al. |
| 2017/0288878 A1 | 10/2017 | Lee et al. |
| 2017/0308520 A1 | 10/2017 | Beahan, Jr. et al. |
| 2017/0315163 A1 | 11/2017 | Wang et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |
| 2017/0371720 A1 | 12/2017 | Basu et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0004575 A1 | 1/2018 | Marriner et al. |
| 2018/0032410 A1 | 2/2018 | Kang et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0067873 A1 | 3/2018 | Pikhur et al. |
| 2018/0069702 A1 | 3/2018 | Ayyadevara et al. |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0113770 A1 | 4/2018 | Hasanov et al. |
| 2018/0121665 A1 | 5/2018 | Anderson et al. |
| 2018/0129684 A1 | 5/2018 | Wilson et al. |
| 2018/0144263 A1 | 5/2018 | Saxena et al. |
| 2018/0150339 A1 | 5/2018 | Pan et al. |
| 2018/0152401 A1 | 5/2018 | Tandon et al. |
| 2018/0152405 A1 | 5/2018 | Kuo et al. |
| 2018/0152406 A1 | 5/2018 | Kuo et al. |
| 2018/0192101 A1 | 7/2018 | Bilobrov |
| 2018/0225096 A1 | 8/2018 | Mishra et al. |
| 2018/0227300 A1 | 8/2018 | Nakic et al. |
| 2018/0239636 A1 | 8/2018 | Arora et al. |
| 2018/0253333 A1 | 9/2018 | Gupta |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0314845 A1 | 11/2018 | Anderson et al. |
| 2018/0316552 A1 | 11/2018 | Subramani Nadar et al. |
| 2018/0341504 A1 | 11/2018 | Kissell |
| 2018/0365422 A1 | 12/2018 | Callaghan et al. |
| 2018/0375781 A1 | 12/2018 | Chen et al. |
| 2019/0004866 A1 | 1/2019 | Du et al. |
| 2019/0018715 A1 | 1/2019 | Behrendt et al. |
| 2019/0028552 A1 | 1/2019 | Johnson, II et al. |
| 2019/0043231 A1 | 2/2019 | Uzgin et al. |
| 2019/0072529 A1 | 3/2019 | Andrawes et al. |
| 2019/0073430 A1 | 3/2019 | Webster |
| 2019/0079751 A1 | 3/2019 | Foskett et al. |
| 2019/0102278 A1 | 4/2019 | Gahlin et al. |
| 2019/0140831 A1 | 5/2019 | De Lima Junior et al. |
| 2019/0141015 A1 | 5/2019 | Nellen |
| 2019/0147085 A1 | 5/2019 | Pal et al. |
| 2019/0171423 A1 | 6/2019 | Mishra et al. |
| 2019/0179678 A1 | 6/2019 | Banerjee et al. |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0196884 A1 | 6/2019 | Wagner |
| 2019/0235848 A1 | 8/2019 | Swiecki et al. |
| 2019/0238590 A1 | 8/2019 | Talukdar et al. |
| 2019/0250937 A1 | 8/2019 | Thomas et al. |
| 2019/0268152 A1 | 8/2019 | Sandoval et al. |
| 2019/0286475 A1 | 9/2019 | Mani |
| 2019/0286492 A1 | 9/2019 | Gulsvig Wood et al. |
| 2019/0303117 A1 | 10/2019 | Kocberber et al. |
| 2019/0311115 A1 | 10/2019 | Lavi et al. |
| 2019/0318312 A1 | 10/2019 | Foskett et al. |
| 2019/0324813 A1 | 10/2019 | Bogineni et al. |
| 2019/0339955 A1 | 11/2019 | Kuo et al. |
| 2019/0361802 A1 | 11/2019 | Li et al. |
| 2019/0363885 A1 | 11/2019 | Schiavoni et al. |
| 2019/0370113 A1 | 12/2019 | Zhang et al. |
| 2020/0007456 A1 | 1/2020 | Greenstein et al. |
| 2020/0026527 A1 | 1/2020 | Xu et al. |
| 2020/0028936 A1 | 1/2020 | Gupta et al. |
| 2020/0034471 A1 | 1/2020 | Danilov et al. |
| 2020/0057680 A1 | 2/2020 | Marriner et al. |
| 2020/0065079 A1 | 2/2020 | Kocberber et al. |
| 2020/0073770 A1 | 3/2020 | Mortimore, Jr. et al. |
| 2020/0073987 A1 | 3/2020 | Perumala et al. |
| 2020/0081745 A1 | 3/2020 | Cybulski et al. |
| 2020/0110691 A1 | 4/2020 | Bryant et al. |
| 2020/0120120 A1 | 4/2020 | Cybulski |
| 2020/0136933 A1 | 4/2020 | Raskar |
| 2020/0153798 A1 | 5/2020 | Liebherr |
| 2020/0153897 A1 | 5/2020 | Mestery et al. |
| 2020/0167208 A1 | 5/2020 | Floes et al. |
| 2020/0192646 A1 | 6/2020 | Yerramreddy et al. |
| 2020/0213151 A1 | 7/2020 | Srivatsan et al. |
| 2020/0327236 A1 | 10/2020 | Pratt et al. |
| 2020/0341799 A1 | 10/2020 | Wagner et al. |
| 2020/0366587 A1 | 11/2020 | White et al. |
| 2021/0081233 A1 | 3/2021 | Mullen et al. |
| 2021/0117534 A1 | 4/2021 | Maximov et al. |
| 2021/0232415 A1 | 7/2021 | Wagner et al. |
| 2021/0389963 A1 | 12/2021 | Wagner |
| 2022/0004423 A1 | 1/2022 | Brooker et al. |
| 2022/0012083 A1 | 1/2022 | Brooker et al. |

FOREIGN PATENT DOCUMENTS

| | | |
|---|---|---|
| CN | 101002170 A | 7/2007 |
| CN | 101267334 A | 9/2008 |
| CN | 101345757 A | 1/2009 |
| CN | 101496005 A | 7/2009 |
| CN | 101627388 A | 1/2010 |
| CN | 101640700 A | 2/2010 |
| CN | 101764824 A | 6/2010 |
| CN | 102171712 A | 8/2011 |
| CN | 102365858 A | 2/2012 |
| CN | 102420846 A | 4/2012 |
| CN | 102761549 A | 10/2012 |
| CN | 103098027 A | 5/2013 |
| CN | 103140828 A | 6/2013 |
| CN | 103384237 A | 11/2013 |
| CN | 103731427 A | 4/2014 |
| CN | 104111848 A | 10/2014 |
| CN | 104243479 A | 12/2014 |
| CN | 104903854 A | 9/2015 |
| CN | 105122243 A | 12/2015 |
| CN | 109478134 A | 3/2019 |
| CN | 112513813 A | 3/2021 |
| EP | 2663052 A1 | 11/2013 |

(56) References Cited

FOREIGN PATENT DOCUMENTS

| | | |
|---|---|---|
| EP | 3201762 A1 | 8/2017 |
| EP | 3254434 A1 | 12/2017 |
| EP | 3356938 A1 | 8/2018 |
| EP | 3201768 B1 | 12/2019 |
| EP | 3811209 A1 | 4/2021 |
| EP | 3814895 A1 | 5/2021 |
| EP | 3857375 A1 | 8/2021 |
| EP | 4064052 A1 | 9/2022 |
| JP | 2002-287974 A | 10/2002 |
| JP | 2006-107599 A | 4/2006 |
| JP | 2007-080161 A | 3/2007 |
| JP | 2007-538323 A | 12/2007 |
| JP | 2010-026562 A | 2/2010 |
| JP | 2011-065243 A | 3/2011 |
| JP | 2011-233146 A | 11/2011 |
| JP | 2011-257847 A | 12/2011 |
| JP | 2012-078893 A | 4/2012 |
| JP | 2012-104150 A | 5/2012 |
| JP | 2013-156996 A | 8/2013 |
| JP | 2014-525624 A | 9/2014 |
| JP | 2016-507100 A | 3/2016 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| KR | 10-357850 B1 | 10/2002 |
| KR | 10-2021-0019533 A | 2/2021 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2015/149017 A1 | 10/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/005829 A1 | 1/2018 |
| WO | WO 2018/098443 A1 | 5/2018 |
| WO | WO 2018/098445 A1 | 5/2018 |
| WO | WO 2020/005764 A1 | 1/2020 |
| WO | WO 2020/006081 A1 | 1/2020 |
| WO | WO 2020/069104 A1 | 4/2020 |
| WO | WO 2020/123439 A1 | 6/2020 |
| WO | WO 2020/264431 A1 | 12/2020 |
| WO | WO 2021/108435 A1 | 6/2021 |

OTHER PUBLICATIONS

Abebe, Michael et al., EC-Store: Bridging the Gap Between Storage and Latency in Distributed Erasure Coded Systems, 2018, IEEE (Year: 2018).*

Rashmi, K.V. et al., EC-Cache: Load-Balanced, Low-Latency Cluster Caching with Online Erasure Coding, 2016, USENIX (Year: 2016).*

Anonymous: "Docker run reference", Dec. 7, 2015, XP055350246, Retrieved from the Internet: URL:https://web.archive.org/web/20151207111702/https://docs.docker.com/engine/reference/run/ [retrieved on Feb. 28, 2017].

Adapter Pattern, Wikipedia, https://en.wikipedia.org/w/index.php?title=Adapter_pattern&oldid=654971255, [retrieved May 26, 2016], 6 pages.

Amazon, "AWS Lambda: Developer Guide", Jun. 26, 2016 Retrieved from the Internet, URL:http://docs.aws.amazon.com/lambda/latest/dg/lambda-dg.pdf, [retrieved on Aug. 30, 2017], 314 pages. __.

Amazon, "AWS Lambda: Developer Guide", Apr. 30, 2016 Retrieved from the Internet, URL: https://web.archive.org/web/20160430050158/http://docs.aws.amazon.com:80/lambda/latest/dg/lambda-dg.pdf, 346 pages.

Amazon, "AWS Lambda: Developer Guide", Retrieved from the Internet, 2019, URL : http://docs.aws.amazon.com/lambda/ latest/dg/lambda-dg.pdf, 521 pages.

Balazinska et al., Moirae: History-Enhanced Monitoring, Published: Jan. 2007, 12 pages.

Bebenita et al., "Trace-Based Compilation in Execution Environments without Interpreters," ACM, Copyright 2010,10 pages.

Ben-Yehuda et al., "Deconstructing Amazon EC2 Spot Instance Pricing", ACM Transactions on Economics and Computation 1.3, Sep. 2013, 15 pages.

Bhadani et al., Performance evaluation of web servers using central load balancing policy over virtual machines on cloud, Jan. 2010, 4 pages.

Bryan Liston, "Ad Hoc Big Data Processing Made Simple with Serverless Map Reduce", Nov. 4, 2016, Amazon Web Services <https :/laws. amazon .com/bl ogs/compute/ad-hoc-big-data-processi ng-made-si mple-with-serverless-mapred uce >.

CodeChef ADMIN discussion web page, retrieved from https://discuss.codechef.eom/t/what-are-the-memory-limit-and-stack-size-on-codechef/14159, retrieved on Sep. 10, 2019.

CodeChef IDE web page, Code, Compile & Run, retrieved from https://www.codechef.com/ide, retrieved on Sep. 9, 2019.

Czajkowski, G., and L. Daynes, Multitasking Without Compromise: A Virtual Machine Evolution 47(4a):60-73, ACM SIGPLAN Notices—Supplemental Issue, Apr. 2012.

Das et al., Adaptive Stream Processing using Dynamic Batch Sizing, Nov. 2014, 13 pages.

Deis, Container, Jun. 2014, 1 page.

Dean et al., "MapReduce: Simplified Data Processing on Large Clusters", ACM, 2008, pp. 107-113.

Dombrowski, M., et al., Dynamic Monitor Allocation in the Java Virtual Machine, JTRES '13, Oct. 9-11, 2013, pp. 30-37.

Dornemann et al., "On-Demand Resource Provisioning for BPEL Workflows Using Amazon's Elastic Compute Cloud", 9th IEEE/ACM International Symposium on Cluster Computing and the Grid, 2009, pp. 140-147.

Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.

Ekanayake et al., "Twister: A Runtime for Iterative MapReduce", ACM, 2010, pp. 810-818.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Fan et al., Online Optimization of VM Deployment in IaaS Cloud, Dec. 17, 2012-Dec. 19, 2012, 6 pages.

Ha et al., A Concurrent Trace-based Just-In-Time Compiler for Single-threaded JavaScript, utexas.edu, Jun. 2009.

Hammoud et al., "Locality-Aware Reduce Task Scheduling for MapReduce", IEEE, 2011, pp. 570-576.

Han et al., Lightweight Resource Scaling for Cloud Applications, May 13, 2012-May 16, 2012, 8 pages.

Hoffman, Auto scaling your website with Amazon Web Services (AWS)—Part 2, Cardinalpath, Sep. 2015, 15 pages.

http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.

https://www.codechef.com code error help page from Jan. 2014, retrieved from https://www.codechef.com/JAN14/status/ERROR,va123, 2014.

http://www.codechef.com/ide web page from date Apr. 5, 2015, retrieved using the WayBackMachine, from https://web.archive.org/web/20150405045518/http://www.codechef.com/ide, 2015.

(56) References Cited

OTHER PUBLICATIONS

Huang, Zhe, Danny HK Tsang, and James She. "A virtual machine consolidation framework for mapreduce enabled computing clouds." 2012 24th International Teletraffic Congress (ITC 24). IEEE, Sep. 4, 2012-Sep. 7, 2012.
Kamga et al., Extended scheduler for efficient frequency scaling in virtualized systems, Jul. 2012, 8 pages.
Kato, et al. "Web Service Conversion Architecture of the Web Application and Evaluation"; Research Report from Information Processing Society, Apr. 3, 2006 with Machine Translation.
Kazempour et al., AASH: an asymmetry-aware scheduler for hypervisors, Jul. 2010, 12 pages.
Kim et al., "MRBench: A Benchmark for Map-Reduce Framework", IEEE, 2008, pp. 11-18.
Kraft et al., 10 performance prediction in consolidated virtualized environments, Mar. 2011, 12 pages.
Krsul et al., "VMPlants: Providing and Managing Virtual Machine Execution Environments for Grid Computing", SUPERCOMPUTING, 2004. Proceedings of the ACM/IEEESC 2004 CONFERENCE Pittsburgh, PA, XP010780332, Nov. 6-12, 2004, 12 pages.
Lagar-Cavilla et al., "SnowFlock: Virtual Machine Cloning as a First-Class Cloud Primitive", ACM Transactions on Computer Systems, vol. 29, No. 1, Article 2, Publication date: Feb. 2011, in 45 pages.
Lin, "MR-Apriori: Association Rules Algorithm Based on MapReduce", IEEE, 2014, pp. 141-144.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, Jul. 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Ryden et al., "Nebula: Distributed Edge Cloud for Data-Intensive Computing", IEEE, 2014, pp. 491-492.
Sakamoto, et al. "Platform for Web Services using Proxy Server"; Research Report from Information Processing Society, Mar. 22, 2002, vol. 2002, No. 31.
Search Query Report from IP.com, dated Dec. 2, 2020.
Search Query Report from IP.com, dated May 27, 2021.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, Nov. 10, 2009, 4 pages.
Tan et al., Provisioning for large scale cloud computing services, Jun. 2012, 2 pages.
Tange, "GNU Parallel: The Command-Line Power Tool", vol. 36, No. 1, Jan. 1, 1942, pp. 42-47.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, Dec. 16, 2014-Dec. 19, 2014. Retrieved on Feb. 14, 2019, Retrieved from the internet: URL<https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en.wikipedia.org/wiki/Application_programming_interface.
Wikipedia List_of_HTTP status_codes web page, retrieved from https://en.wikipedia.org/wiki/List_of_HTTP status_codes, retrieved on Sep. 10, 2019.
Wikipedia Recursion web page from date Mar. 26, 2015, retrieved using the WayBackMachine, from https://web.archive.org/web/20150326230100/https://en.wikipedia.org/wiki/Recursion_(computer _science), 2015.
Wikipedia subroutine web page, retrieved from https://en.wikipedia.org/wiki/Subroutine, retrieved on Sep. 10, 2019.
Wood, Timothy, et al. "Cloud Net: dynamic pooling of cloud resources by live WAN migration of virtual machines." ACM Sigplan Notices 46.7 (2011): 121-132. (Year: 2011).
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yang, The Application of MapReduce in the Cloud Computing:, IEEE, 2011, pp. 154-156.
Yue et al., AC 2012-4107: Using Amazon EC2 in Computer and Network Security Lab Exercises: Design, Results, and Analysis, 2012, American Society for Engineering Education, Jun. 10, 2012.
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
Office Action in Chinese Application No. 202110268031.5, dated Sep. 3, 2021.
Office Action in Canadian Application No. 2,962,633 dated May 21, 2020.
Office Action in Canadian Application No. 2,962,633 dated Jun. 18, 2021.
Office Action in European Application No. 19199402.9 dated Mar. 23, 2021.
Office Action in European Application No. 19199402.9 dated Dec. 3, 2021 in 4 pages.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
Extended Search Report in European Application No. 19199402.9 dated Mar. 6, 2020.
Office Action in Japanese Application No. 2017-516160 dated Jan. 15, 2018.
Notice of Allowance in Japanese Application No. 2017-516160 dated May 8, 2018.
Office Action in Canadian Application No. 2,962,631 dated May 19, 2020.
Office Action in Canadian Application No. 2,962,631 dated May 31, 2021.
Office Action in Indian Application No. 201717013356 dated Jan. 22, 2021.
Office Action in Japanese Application No. 2017-516168 dated Mar. 26, 2018.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
Office Action in Indian Application No. 201717019903 dated May 18, 2020.

(56) References Cited

OTHER PUBLICATIONS

International Search Report and Written Opinion in PCT/US2015/064071 dated Mar. 16, 2016.
International Preliminary Report on Patentability in PCT/US2015/064071 dated Jun. 6, 2017.
Office Action in Australian Application No. 2016215438 dated Feb. 26, 2018.
Notice of Allowance in Australian Application No. 2016215438 dated Nov. 19, 2018.
Office Action in Canadian Application No. 2,975,522 dated Jun. 5, 2018.
Notice of Allowance in Canadian Application No. 2,975,522 dated Mar. 13, 2020.
Office Action in Indian Application No. 201717027369 dated May 21, 2020.
International Search Report and Written Opinion in PCT/US2016/016211 dated Apr. 13, 2016.
International Preliminary Report on Patentability in PCT/US2016/016211 dated Aug. 17, 2017.
Office Action in Chinese Application No. 201680020768.2 dated May 14, 2021 in 23 pages.
Office Action in Chinese Application No. 201680020768.2 dated Sep. 24, 2021 in 20 pages.
Decision to refuse a European Patent Application in European Patent Application No. 16716797.2 dated Dec. 20, 2021 in 20 pages.
First Examination Report for Indian Application No. 201717034806 dated Jun. 25, 2020.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
Office Action in Chinese Application No. 2016800562398 dated Jun. 18, 2021.
International Search Report and Written Opinion in PCT/US2016/054774 dated Dec. 16, 2016.
Office Action in European Application No. 16781265.0 dated Jul. 13, 2020.
Office Action in Indian Application No. 201817013748 dated Nov. 20, 2020.
International Preliminary Report on Patentability in PCT/US2016/054774 dated Apr. 3, 2018.
Office Action in Chinese Application No. 201680072794.X dated Jun. 22, 2021.
Office Action in European Application No. 16823419.3 dated Mar. 12, 2021.
International Search Report and Written Opinion in PCT/US2016/066997 dated Mar. 20, 2017.
International Preliminary Report on Patentability in PCT/US2016/066997 dated Jun. 26, 2018.
Office Action in Chinese Application No. 201780022789.2 dated Apr. 28, 2021.
Office Action in European Application No. 17776325.7 dated Apr. 12, 2021.
International Search Report and Written Opinion in PCT/US/2017/023564 dated Jun. 6, 2017.
International Preliminary Report on Patentability in PCT/US/2017/023564 dated Oct. 2, 2018.
Office Action in Chinese Application No. 2017800451968 dated May 26, 2021.
Office Action in Chinese Application No. 2017800451968 dated Dec. 3, 2021 in 20 pages.
Office Action in European Application No. 17740533.9 dated May 4, 2021.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.
Office Action in European Application No. 17743108.7 dated Dec. 22, 2020.
International Search Report and Written Opinion mailed Oct. 15, 2019 for International Application No. PCT/US2019/039246 in 16 pages.
International Preliminary Report on Patentability dated Dec. 29, 2020 for International Application No. PCT/US2019/039246 in 8 pages.
Office Action in Japanese Application No. 2020-572441 dated Dec. 22, 2021 in 8 pages.
International Search Report for Application No. PCT/US2019/038520 dated Aug. 14, 2019.
International Preliminary Report on Patentability for Application No. PCT/US2019/038520 dated Dec. 29, 2020.
International Preliminary Report on Patentability and Written Opinion in PCT/US2019/053123 dated Mar. 23, 2021.
International Search Report and Written Opinion in PCT/US2019/053123 dated Jan. 7, 2020.
International Search Report for Application No. PCT/US2019/065365 dated Mar. 19, 2020.
International Preliminary Report on Patentability for Application No. PCT/US2019/065365 dated Jun. 8, 2021.
International Search Report for Application No. PCT/US2020/039996 dated Oct. 8, 2020.
International Preliminary Report on Patentability for Application No. PCT/US2020/039996 dated Jan. 6, 2022.
International Search Report for Application No. PCT/US2020/062060 dated Mar. 5, 2021.
Office Action in Japanese Application No. 2020-572443 dated Feb. 28, 2022.
Communication Pursuant to Article 94(3) EPC in European Application No. 19199402.9 dated Apr. 19, 2022 in 5 pages.
Office Action in European Application No. 16823419.3 dated May 20, 2022 in 6 pages.
Office Action in European Application No. 19740451.0 dated Jun. 13, 2022 in 4 pages.
Office Action in Korean Application No. 10-2021-7000975 dated Mar. 31, 2022 in 12 pages.
Office Action in Japanese Application No. 2021-517335 dated May 16, 2022.
International Preliminary Report on Patentability for Application No. PCT/US2020/062060 dated Jun. 9, 2022 in 9 pages.
Anonymous: "Amazon Elastic Compute Cloud User Guide for Linux Instances—first 400 pages of 795," Apr. 8, 2016 (Apr. 8, 2016_, XP055946665, Retrieved from the Internet: URL:https://web.archive.org/web/20160408211543if_/http://docs.aws.amazon.com/AWSEC2/latest/UserGuide/ec2-ug.pdf (retrieved on Jul. 27, 2022] 795 pages.
Anonymous: "Amazon Simple Workflow Service Developer Guide API Version Jan. 25, 2012," Jun. 11, 2016 (Jun. 11, 2016), XP055946928, Retrieved from the Internet: URL:https://web.archive.org/web/20160111075522if_/http://docs.aws.amazon.com/amazonswf/latest/developerguide/swf-dg.pdf [retrieved on Jul. 28, 2022] in 197 pages.
Anonymous: "AWS Flow Framework for Java," Apr. 7, 2016 (Apr. 7, 2016), XP055946535, Retrieved from the Internet: URL:https://web.archive.org/web/20160407214715if_/http://docs.aws.amazon.com/amazonswf/latest/awsflowguide/swf-aflow.pdf, [retrieved Jul. 27, 2022] in 139 pages.
Office Action in Canadian Application No. 2,962,631 dated Jul. 26, 2022.
European Examination Report, re EP Application No. 17743108.7, dated Oct. 12, 2022.

(56) References Cited

OTHER PUBLICATIONS

First Chinese Office Action in Chinese Application No. 201780045148.9, dated Sep. 29, 2022.
Office Action in Japanese Application No. 2020-572443 dated Sep. 29, 2022.
Office Action (Decision of Refusal) in Korean Application No. 10-2021-7000975 dated Oct. 28, 2022.
Office Action in European Application No. 19736909.3 dated Oct. 12, 2022.
Examination Report for EP Application No. 19828515.7 dated Dec. 6, 2022.

* cited by examiner

FAST DISTRIBUTED CACHING USING ERASURE CODED OBJECT PARTS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

Virtual machines are typically defined at least partly based on the data used to run the virtual machine, which is often packaged into a disk image. Generally described, a disk image is data set, such as a file, that contains the contents and structure of a disk volume or data storage device. For example, a disk image may contain an operating system, libraries, utilities, applications, configurations, and the like. By generating a virtual machine and provisioning it with a disk that matches the contents of the disk image, a user may configure the virtual machine to implement desired functionality. Disk images are also utilized in other virtualization techniques, such as operating-system-level virtualization, a technique in which the kernel of an operating system enables multiple isolated user space instances (often called "containers") without requiring virtualization of the kernel.

DETAILED DESCRIPTION

Figure 1:
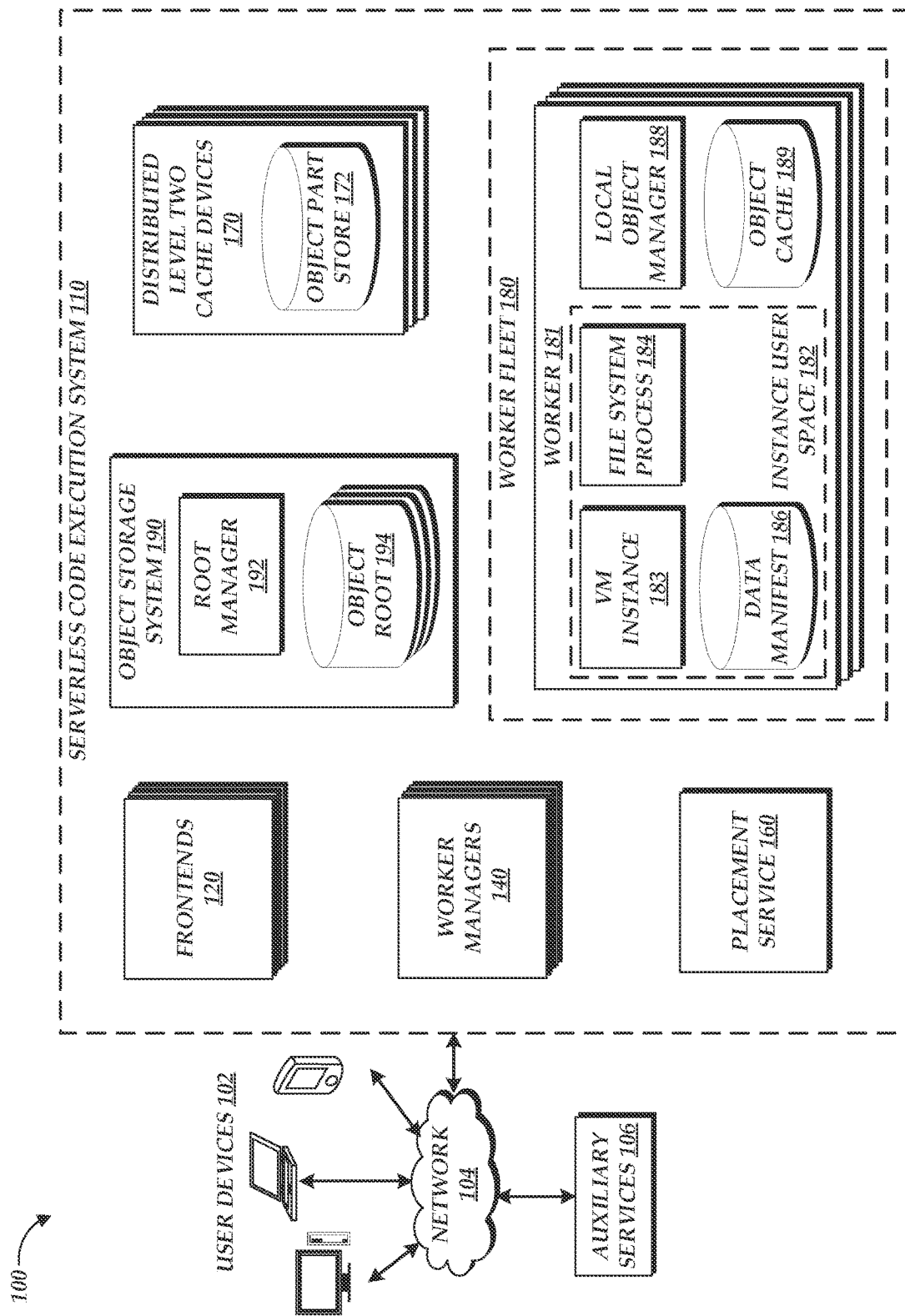
FIG. 1 is a block diagram depicting an illustrative environment in which a serverless code execution system can enable low latency execution of code by providing rapid access to data sets.

Generally described, aspects of the present disclosure relate to facilitating execution of code on a serverless code execution system, which may also be referred to as an on-demand code execution system. As described herein, a serverless code execution system enables rapid execution of source code, which may be supplied by users of the on-demand code execution system. For example, a user may submit a script in a specific programming language (e.g., the PYTHON™ language) that, when executed, implements network-based processing for a user-facing application (e.g., a mobile device "app"). The serverless code execution system can then enable the user to submit "calls" to execute that script, at which point the system will securely execute the script to provide the desired functionality. Unlike some other network-based services, a serverless code execution system can remove the need for a user to maintain or configure a computing device, either virtual or physical, to support code execution. It is this lack of need for a user to maintain a device that leads to the "serverless" moniker, though of course the serverless code execution system itself, as opposed to individual users, likely maintains servers to support code execution. Serverless systems can be particularly well suited for processes with varying demand, as the serverless system can rapidly scale up and down the computing resources used to service such processes. In comparison to traditional systems using dedicated servers (physical or virtual), serverless systems often provide much higher efficiency with respect to computing resources used.

One challenge in serverless code execution systems is rapid provisioning of an execution environment (such as a virtual machine instance or software container) to support code execution. One approach is to await calls to execute a set of code, and in response to that call, to generate an execution environment for the code, provision the environment with the code, and execute the code. While effective, this approach can introduce significant latency into request handling, particularly as compared to a server that is pre-provisioned. For even moderately latency sensitive workloads, this approach may render serverless computing infeasible. Another approach is to pre-create environments on the serverless system and pre-provision those environments with all necessary data (e.g., operating systems, runtimes, libraries, etc.) to service any possible request to execute code. However, this approach largely negates the efficiency gains of serverless computing, and where a large amount of code is supported, may quickly overwhelm the resources of a serverless code execution system. Middling approaches, such as where a serverless code execution system attempts to predict future calls to execute code and to pre-provision environments for those calls, are possible. However, predicting future calls is difficult and generally inaccurate, leading either to excessive resource usage or excessive latency.

The scale of the above-noted problems is in many cases proportional to the size of data required to support execution of code. For code that depends on relatively small sets of data (e.g., on the order of kilobytes, single megabytes, tens of megabytes, etc.), the latency to provision environments "on-demand" (in response to a request to execute code) may be acceptable to an end user. Similarly, the computing resources needed to maintain a pre-provisioned environment for such a set of code may be minimal. However, many end users may desire to execute code that depends on larger sets of data. For example, an end user may desire to create a disk image that supports execution of code, including for example an operating system, runtime, libraries, the code itself, configuration files, or the like. On example of such a disk image is an image conforming to the Open Container Initiative (OCI) Image Specification, which is known in the art. Because of the type of data contained in such a disk image (e.g., a complete set of data facilitating execution of code, including an operating system), these images can be relatively large; often on the order of gigabytes in size. Attempting to either pre-provision environments with a large number of such images would quickly overwhelm many computing systems, while a naïve approach to on-demand provisioning of environments with such images, such as by transferring the whole image across a network to a device prior to executing the code, would introduce significant latency.

Embodiments of the present disclosure address these problems by providing for more efficient on-demand provisioning of environments with large data sets, such as disk images supporting code execution. More specifically, embodiments of the present disclosure enable "lazily" loading large data sets into an execution environment, by quickly providing a minimum portion of a data set needed to being execution of code, and providing additional portions of the data set on-demand from the code execution. More specifically, a request to execute code may be satisfied by provisioning an execution environment with access to a data set, without actually transferring the entire data set to a local storage drive for the environment. Instead, the data set may be made available via a file system that operates to selectively retrieve portions of the data set as they are read by the code execution. For example, a host computing device that is hosting an execution environment may be configured to provide a Filesystem in User Space (FUSE) storage device that—from the view of the execution environment— contains the data set. On reads to the FUSE storage device, a local FUSE agent may selectively retrieve any required portions of the data set and make the read portion of the data set available on the FUSE storage device. Thus, from the point of view of the execution environment, complete local access to the data set is provided. However, because the data set is "lazily" loaded, code execution can begin before the entire data set is transferred to the execution environment. Indeed, if the environment never requires access to a portion of the data set, that portion need never be transferred to the environment. As such, the latency to execute code is reduced.

Generally, transferring a portion of a data set to an execution environment can include transferring that data over a network. For example, the data set may be stored in a (logically) centralized network storage service, and portions of a data set may be transferred on-demand to an execution environment as code within that environment reads the data set. To minimize network latency, embodiments of the present disclosure can utilize a multi-level caching system for portions of data sets. For example, a host device hosting execution environments may provide a first level cache, such that recently read portions of data sets are stored on a storage drive of the host device and thus subsequent reads of those portions can be handled locally without network transfer. One or more distributed level two caching devices can provide a second level cache, whereby portions of data sets read by multiple execution environments among multiple host devices are stored within the second level cache. The second level cache may be closer to the host devices than the centralized network storage service, and/or have a network connection to the host devices that has more bandwidth than a connection between the host devices and the centralized network storage service. Thus, portions of data sets that are have not been read recently enough to be stored in a host-local cache may nevertheless be stored in the second level cache, enabling an execution environment to more quickly access those portions. In this configuration, the network storage service may act as a "origin" server for portions of the data set, such that if a portion exists in neither the first nor the second level cache, it can be retrieved from the network storage service.

While caching can improve performance of commonly-used data sets, latency may nevertheless be incurred due to "cache misses"—instances in which a read portion of a data set does not exist in either a local or level two cache. Such cache misses may be especially prevalent when data sets of different users are treated as distinct. In this configuration, it might be expected that only frequently executed code is associated with a cached data set, and that execution of other code would incur frequent cache misses to retrieve their associated data sets. Thus, to reduce the number of cache misses, it may be desirable to provide for sharing of portions between data sets. Typical disk imaging mechanisms do not provide for such sharing, or do so only in a limited fashion. To increase the number of shared portions among data sets, embodiments of the present disclosure may utilize the techniques disclosed in U.S. patent application Ser. No. 17/037,369, filed on Sep. 29, 2020 and entitled "EFFICIENT DEDUPLICATION USING BLOCK-BASED CONVERGENT ENCRYPTION" (the "'369 Application" the entirety of which is hereby incorporated by reference. As disclosed in more detail therein, each data set (e.g., disk image) may be divided into a set of portions (referred to in the '369 Application as "blocks" and generally referred to herein as portions or "objects") and encrypted using a convergent encryption process, such that if two portions of different data sets contain the same data, they result in identical encrypted portions. Each portion may additionally be identified according to a unique identifier derivable from the portion (and potentially other data), such as a hash value of the portion or message authentication code (MAC) for the portion. These portions may be of a fixed size, such as 512 kilobytes, across all data sets handled by a serverless code execution system. Accordingly, when two data sets provided to the serverless code execution system overlap in at least one fixed-size portion, that portion can be treated as shared. As such, when a first code execution attempts to read the shared portion, it may be cached such that other code executions may (if they are also associated with a data set that includes the shared portion) read the portion from the cache. Sharing of portions among code executions can therefore significantly reduce cache misses, decreasing the latency associated with a code execution reading data from a data set.

Another potential cause for latency when "lazily" transferring portions of data sets is the potential for failures or delays within the level two cache. For example, a device providing the level two cache may fail, meaning that attempts to retrieve a portion from that device would also fail. Even absent outright failure, such a device may experience partial failures or slowdowns that significantly delay transfer of a requested portion. Embodiments of this disclosure can provide a level two cache configured to overcome these problems by distributing data set portions among multiple devices within the level two cache. More specifically, embodiments of the present disclosure can utilize the technique of erasure coding (a known technique in the art) to divide a data set portion into a number of erasure-coded parts.

In accordance with known techniques of erasure coding, data (e.g., a file) can be divided into multiple parts, and reconstructed so long as a threshold number of those parts are known. For example, in a "5/1" erasure coding schema, data is divided into five parts and can be reconstructed so long as no more than one part is lost. An illustrative example of erasure coding is the use of a parity part. For example, data may be divided into two equally sized parts, and a third part may be constructed with each bit of the third part being a "exclusive or" (XOR) value of the corresponding bits of the respective first and second parts. In this example, loss of any single part can be tolerated, as the bits for the missing parts can be calculated from the values of the remaining two parts. A variety of more complex erasure coding techniques are known, enabling specification of a wide variety of "sizes" (e.g., number of parts) and loss tolerance thresholds.

In embodiments of the present disclosure, each portion of a disk image may be divided into a number of parts via erasure coding, which parts are then distributed among devices providing a level two cache. In this way, failures among the level two cache are tolerated up to the loss tolerance threshold of the erasure coding used. Moreover, this technique provides for improvements with respect to slowdowns as well as outright failures. Specifically, a host device may query a level two cache system for all parts of a requested portion, but begin to reconstruct the portion as soon as the minimum number of parts (the total number minus the loss tolerance threshold) are retrieved. In the instance that retrieval of parts experiences a "long tail" distribution (where one or more parts takes much longer to retrieve), this technique enables a host device to "cut off" that tail, servicing the request without delay due to the slower parts.

While examples above are provided with respect to disk images, embodiments of the present disclosure may be utilized to provide any number of data sets. For example, a serverless code execution system may in some instances utilize virtual machine snapshots (e.g., storing a state of random access memory (RAM), central processing unit (CPU) registers, etc.) to record a state of a virtual machine instance at a time that the instance is initialized to execute code. The serverless code execution system may then service requests to execute code by using these snapshots to recreate the virtual machine instance as reflected in the snapshot, which may potentially avoid delays such as booting an operating system. Illustrative techniques for use of snapshots to support rapid execution of code on a serverless code execution system are disclosed, for example, in U.S. patent application Ser. No. 16/045,593, filed Jul. 25, 2018 and entitled "REDUCING EXECUTION TIMES IN AN ON-DEMAND CODE NETWORK CODE EXECUTION SYSTEM USING SAVED MACHINE STATES" (the "'593 Application"), the entirety of which is hereby incorporated by reference. The techniques described herein may be utilized to provide such snapshots to execution environments, in addition or alternatively to disk images. Other types of data set may also be distributed using the techniques described herein. Thus, reference to a disk image as an example data set is intended for illustrative purposes.

Another problem that may occur when distributing data sets is that of garbage collection. In accordance with the above description, embodiments of the present disclosure may generate, for a given data set provided by an end user to support code execution, significant additional data. For example, a disk image may be divided into a number of portions stored on a network storage system. The disk image may further be used to generate a virtual machine snapshot, which snapshot may similarly be divided into portions stored on a network storage system. In the instance that the original data set is maintained, these disk image portions and snapshot portions may be viewed as additional data that support rapid execution of code, but are not strictly necessary to execute that code. Because the number of data sets (including disk images and snapshots) maintained by a serverless code execution system may be large, it may be desirable to limit the number of disk image portions or snapshot portions maintained on the network storage system. In a similar manner to traditional caching, for example, it may be desirable to maintain only disk image portions or snapshot portions that recently supported code execution, while deleting those portions that have not recently supported code execution. This process of deleting not-recently-used portions is referred to herein as "garbage collection."

While described in a simple manner above, garbage collection within a network storage system may in practice be a difficult problem. To support storage of a large volume of data, the network storage system may be distributed among multiple devices. A well-known issue in such distributed systems is that of "reference counting"—knowing how many processes rely on a specific piece of data at any given time. Typically, if a process relies on data, it is undesirable to garbage collect that data. However, the shared nature of data set (e.g., disk image or snapshot) portions used by present embodiments makes reference counting with respect to such portions difficult. For example, a process may communicate with each relevant device in the distributed system to detect that a given portion has not been accessed in a threshold period of time, and therefore may delete that portion. Unbeknownst to that process, a separate process may—during the data gathering of the first process—use the portion. Thus, deletion by the first process would result in an error to the second process. Accordingly, fine-grained usage tracking, such as at a portion level, may result in errors.

Embodiments of the present disclosure address this issue by providing coarse-grained garbage collection, in a manner that minimizes potential for errors in a serverless code execution system while still enabling efficient garbage collection. More specifically, a network storage system may store data set portions in a number of logically divided partitions, referred to herein as "roots" (as they represent a logical "root" object structure under which portions may be stored). Each root may undergo a lifecycle, beginning as an active root, to which new portions can be written, and later transitioning to an inactive root that does not support writing of portions. Transitioning between active and inactive may occur periodically, such as on a fixed time scale (e.g., within a few days, a week, two weeks, etc.), with new active roots created to replace those transitioning to an inactive state. Each newly created portion can be placed into an active root, from which the portion can later be read to support code execution. When that root is later transitioned to an inactive state, it may (at least initially) still support reading of the portion. However, on reading a portion from an inactive root, a migration process may also copy the portion into another active root, and further execution environments reliant on that portion can be configured to retrieve the portion from the active root. After a sufficient period of time without supporting a read (e.g., to designate a data set as subject to garbage collection), an inactive root may then be deleted, thus reclaiming resources used to store portions in the inactive root. Because reading from a root may pause the deletion process, the issue of reference counting is substantially reduced or eliminated. Moreover, because reading from an inactive root causes a portion to be copied to an active root, and subsequent environments to read from the active root, this technique enables unused portions to collect within inactive roots and be subject to garbage collection, while commonly used portions are continuously sifted out and "dragged forward" into each subsequent active root. Accordingly, this technique can provide for coarse-grained garbage collection that solves the problems associated with fine-grained garbage collection described above.

As will be appreciated by one of skill in the art in light of the present disclosure, the embodiments disclosed herein improve the ability of computing systems, such as serverless code execution systems, to support rapid execution of code reliant on a data set. Moreover, the presently disclosed embodiments address technical problems inherent within computing systems; specifically, the limited nature of computing resources available to store data sets and the difficulty of rapidly providing required data to code executions, when the variety of potential data and code executions is large. These technical problems are addressed by the various technical solutions described herein, including providing for "lazy," on-demand retrieval of data set portions that may be shared among multiple code executions, providing for a level two cache that utilizes erasure coding to provide resiliency and reduced request latency, and providing for a network storage system that implements coarse-grained garbage collection at the level of life-cycled logical storage partitions ("roots"). Thus, the present disclosure represents an improvement on serverless code execution systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which client devices 102 may interact with a serverless code executions system 110 via a network 104. By way of illustration, various example client devices 102 are shown in communication with the serverless code execution system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The serverless code execution system 110 may provide the user computing devices 102 with one or more user interfaces, command-line interfaces (CLI), application programming interfaces (API), and/or other programmatic interfaces for generating and uploading user-executable source code (e.g., as part of a disk image or in association with a data set depended on by the code), invoking the user-provided source code (e.g., submitting a request to execute the source code on the on-demand code execution system 110), scheduling event-based code executions or timed code executions, tracking the user-provided source code, and/or viewing other logging or monitoring information related to their requests and/or source code. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the serverless code execution environment 110 to implement desired functionality on behalf of a user. Auxiliary services 106 can correspond to network-connected computing devices, such as servers, which generate data accessible to the serverless code execution environment 110 or otherwise communicate to the serverless code execution environment 110. For example, the auxiliary services 106 can include web services (e.g., associated with the user computing devices 102, with the serverless code execution system 110, or with third parties), databases, really simple syndication ("RSS") readers, social networking sites, or any other source of network-accessible service or data source. In some instances, auxiliary services 106 may be invoked by code execution on the serverless code execution system 110, such as by API calls to the auxiliary services 106. In some instances, auxiliary services 106 may be associated with the serverless code execution system 110, e.g., to provide billing or logging services to the serverless code execution system 110. In some instances, auxiliary services 106 actively transmit information, such as API calls or other task-triggering information, to the serverless code execution system 110. In other instances, auxiliary services 106 may be passive, such that data is made available for access by the serverless code execution system 110. For example, components of the serverless code execution system 110 may periodically poll such passive data sources, and trigger execution of code within the serverless code execution system 110 based on the data provided. While depicted in FIG. 1 as distinct from the user computing devices 102 and the serverless code execution system 110, in some embodiments, various auxiliary services 106 may be implemented by either the user computing devices 102 or the serverless code execution system 110.

The client devices 102, auxiliary services 106, and serverless code execution system 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The serverless code execution system 110 is depicted in FIG. 1 as operating in a distributed computing environment including several computer systems that are interconnected using one or more computer networks (not shown in FIG. 1). The serverless code execution system 110 could also operate within a computing environment having a fewer or greater number of devices than are illustrated in FIG. 1. Thus, the depiction of the serverless code execution system 110 in FIG. 1 should be taken as illustrative and not limiting to the present disclosure. For example, the serverless code execution system 110 or various constituents thereof could implement various Web services components, hosted or "cloud" computing environments, and/or peer to peer network configurations to implement at least a portion of the processes described herein.

Further, the serverless code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the serverless code execution system 110 is illustrated as connected to the network 104. In some embodiments, any of the components within the serverless code execution system 110 can communicate with other components of the serverless code execution system 110 via the network 104. In other embodiments, not all components of the serverless code execution system 110 are capable of communicating with other components of the environment 100. In one example, only the frontends 120 may be connected to the network 104, and other components of the serverless code execution system 110 may communicate with other components of the environment 100 via the frontends 120.

In FIG. 1, users, by way of user computing devices 102, may interact with the serverless code execution system 110 to provide source code, and establish rules or logic defining when and how such code should be executed on the serverless code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the serverless code execution system 110, and request that the on serverless code execution system 110 execute the code using one or more execution environments that are managed by the system 110. The serverless code execution system 110 can handle the acquisition and configuration of compute capacity (e.g., containers, instances, etc., which are described in greater detail below) based on the code execution request, and execute the code using the compute capacity. The serverless code execution system 110 may automatically scale up and down based on the volume of request to execute code, thereby relieving the user from the burden of having to worry about over-utilization (e.g., acquiring too little computing resources and suffering performance issues) or under-utilization (e.g., acquiring more computing resources than necessary to run the code, and thus overpaying).

To enable interaction with the serverless code execution system 110, the system 110 includes multiple frontends 120, which enable interaction with the serverless code execution system 110. In an illustrative embodiment, the frontends 120 serve as a "front door" to the other services provided by the serverless code execution system 110, enabling users (via user computing devices 102) to provide, request execution of, and view results of computer executable source code. The frontends 120 include a variety of components to enable interaction between the serverless code execution system 110 and other computing devices. For example, each frontend 120 may include a request interface providing user computing devices 102 with the ability to upload or otherwise communication user-specified code and associated data sets to the on-demand code execution system 110 (e.g., in the form of a disk image) and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the source code specified in the request.

References to source code as used herein may refer to any program code (e.g., a program, routine, subroutine, thread, etc.) written in a specific program language. In the present disclosure, the terms "source code," "user code," and "program code," may be used interchangeably. Source code which has been compiled for execution on a specific device is generally referred to herein as "machine code." Both "source code" and "machine code" are representations of the same instructions, which may be collectively referred to as "code." Such code may be executed to achieve a specific function, for example, in connection with a particular web application or mobile application developed by the user. As noted above, individual collections of code (e.g., to achieve a specific function) are referred to herein as "tasks" or "functions," while specific executions of that code are referred to as "task executions," "function executions," "code executions," or simply "executions." Source code for a task may be written, by way of non-limiting example, in JavaScript (e.g., node.js), Java, Python, and/or Ruby (and/or another programming language). Tasks may be "triggered" for execution on the serverless code execution system 110 in a variety of manners. In one embodiment, a user or other computing device may transmit a request to execute a task may, which can generally be referred to as "call" to execute of the task (e.g., a "task call," a "function call," etc.). Such calls may include an identifier of the task to be executed and one or more arguments to be used for executing the task. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

Prior to calling for execution of a task, an end user may submit code for the task and associated data to be used to execute the task. In one embodiment, the code is provided in the form of a disk image containing the code and other data that the code may use during execution. The disk image and associated metadata for the task (e.g., the end user who "owns" the task or other information regarding the task) may be stored within an object storage system 190. The object storage system 190 of FIG. 1 may represent any of a number of object storage systems, such as AMAZON™'s SIMPLE STORAGE SERVICE™ (or "S3™"). In accordance with embodiments of the present disclosure, a disk image may further be divided into a number of portions, each stored as a separate object on the object storage system 190. These portions may be stored within an object root 194 on the storage system 190, which represents a logical partition of the storage system 190. As discussed in more detail below, objects within each root 194 may be used to facilitate low latency execution of code, and individual roots may be life-cycled and subject to garbage collection to facilitate removal of unused portions from the system. In one embodiment, submission of a disk image or other data set to the serverless code execution system 110 may cause the system 110 (e.g., via the frontends 120) to generate a set of portions representing the disk image or data set, and to store such portions in an "active" status object root 194. Generation of portions from a data set is described in more detail in the '369 Application, incorporated by reference above. In another embodiment, portions may be generated on an initial call to execute code.

Additionally or alternatively, roots 194 of the object storage service 190 may be used to store other data set portions, such as portions representing a snapshot of a virtual machine instance at a particular point in time (e.g., when initialized to support execution of corresponding code). Creation of such snapshots is discussed in more detail in the '593 Application, incorporated by reference above. Portions for such snapshots may be created, for example, according to the techniques of the '369 Application when applied to such snapshots as an input data set.

In accordance with the teachings of the '369 Application, each data set may be represented in the object storage system 190 as a combination of portions, as well as a manifest that lists the combination of portions that collectively represent that data set. For example, each data set may be associated with a manifest that lists a set of identifiers for data set portions (e.g., "chunks"), such that a device with access to the manifest can retrieve the chunks and recreate the data set. In embodiments where portions are encrypted, a manifest can further include information enabling decryption of those portions, such as the encryption key by which each portion was encrypted. In one embodiment, manifests are stored alongside portions within a given root 194. In another embodiment, manifests are stored separately on the object storage system 190.

As shown in FIG. 1, the object storage system 190 further includes a root manager 192, which is illustratively configured to manage life cycling of roots 194, and to facilitate identification of the status of roots 194. For example, the root manager 192 can provide interfaces enabling other elements of the system 110 to query for a set of roots 194 in a given life cycle state corresponding to a stage of the lifecycle (e.g., "active"), and provide a list of such roots 194 in return. Further, and as discussed in more detail below, the root manager 192 may facilitate transitioning of roots 194 between life cycle states, including copying of portions between different roots 194 based on indicators of use of such portions.

While not shown in FIG. 1, the object storage system 190 may include a variety of data stores other than object roots 194, which may not be subject to, for example, the garbage collection techniques described herein. These other data stores may be used, for example, to store "original" data sets provided by end users, such that portions of disk images, snapshots, etc., may be recreated from original data sets even if such disk image or snapshot portions are subject to garbage collection. These other data stores may additionally be used, for example, to store metadata regarding a function.

After a user has created a task on the serverless code execution system 110, the system 110 may accept calls to execute that task. To calls to execute a task, the frontend 120 can include an execution queue, which can maintain a record of requested task executions. Illustratively, the number of simultaneous task executions by the serverless code execution system 110 is limited, and as such, new task executions initiated at the serverless code execution system 110 (e.g., via an API call, via a call from an executed or executing task, etc.) may be placed on the execution queue and processed, e.g., in a first-in-first-out order. In some embodiments, the on-demand code execution system 110 may include multiple execution queues, such as individual execution queues for each user account. For example, users of the serverless code execution system 110 may desire to limit the rate of task executions on the serverless code execution system 110 (e.g., for cost reasons). Thus, the serverless code execution system 110 may utilize an account-specific execution queue to throttle the rate of simultaneous task executions by a specific user account. In some instances, the serverless code execution system 110 may prioritize task executions, such that task executions of specific accounts or of specified priorities bypass or are prioritized within the execution queue. In other instances, the serverless code execution system 110 may execute tasks immediately or substantially immediately after receiving a call for that task, and thus, the execution queue may be omitted.

As noted above, tasks may be triggered for execution at the serverless code execution system 110 based on explicit calls from user computing devices 102 (e.g., as received at a request interface). Alternatively or additionally, tasks may be triggered for execution at the serverless code execution system 110 based on data retrieved from one or more auxiliary services 106w. To facilitate interaction with auxiliary services 106, the frontend 120 can include a polling interface, which operates to poll auxiliary services 106 for data. Illustratively, the polling interface may periodically transmit a request to one or more user-specified auxiliary services 106 to retrieve any newly available data (e.g., social network "posts," news articles, files, records, etc.), and to determine whether that data corresponds to user-established criteria triggering execution a task on the serverless code execution system 110. Illustratively, criteria for execution of a task may include, but is not limited to, whether new data is available at the auxiliary services 106, the type or content of the data, or timing information corresponding to the data. In some instances, the auxiliary services 106 may function to notify the frontend 120 of the availability of new data, and thus the polling service may be unnecessary with respect to such services.

In addition to tasks executed based on explicit user calls and data from auxiliary services 106, the serverless code execution system 110 may in some instances operate to trigger execution of tasks independently. For example, the serverless code execution system 110 may operate (based on instructions from a user) to trigger execution of a task at each of a number of specified time intervals (e.g., every 10 minutes).

The frontend 120 can further includes an output interface configured to output information regarding the execution of tasks on the serverless code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

Code executions triggered on the serverless code execution system 110 of FIG. 1 are executed by execution environments hosted by a set of workers 181 within a worker fleet 180. Each worker 181 is illustratively a host device configured to host multiple execution environments, which in FIG. 1 are virtual machine instances 183. Execution environments may alternatively include software containers, sometimes referred to as "OS-level virtualization," another virtualization technology known in the art. Thus, where references are made herein to VM instances 183, it should be understood that (unless indication is made to the contrary) a container may be substituted for such instances 183.

While only a single instance 183 is shown in FIG. 1, each worker 181 may host a number of instances 183. Each instance 183 may be isolated from other instances 183, thus ensuring the security of code executions on the serverless code execution system 110. For example, each instance 183 may be divided by a virtualization boundary, by virtue of the instance 183 being a virtual machine hosted by the worker 181. In addition, each instance 183 may exist within a partitioned user space 182 on the worker 181, which logically partitions resources of the worker 181 among instances 183. Each user space 182 may, for example, represent a "chroot" jail—a known isolation technique for LINUX™ operating systems.

To facilitate rapid execution of code, each worker 181 may be configured to maintain a set of instances 183 in a "pre-warmed" state, being at least partially configured to begin execution of code. For example, instances may be created on the worker and configured with access to computing resources (CPU, RAM, drive storage, etc.). In accordance with embodiments of the present disclosure, it may be impractical or impossible to maintain instances 183 in a fully warmed state for all possible code executions, as executions may be associated with a wide variety of at least partially distinct data sets (e.g., disk images and/or snapshots). Thus, instances 183 may be maintained in a "greatest commonality" for a given group of tasks, such as being provisioned with a set of computing resources common to those tasks, being configured to accept an operating system type used by those tasks, etc. \

On receiving instructions to provision an instance 183 to support execution of the task, the worker 181 may adjust the configuration of the instance 183 to support that execution. Specifically, and in accordance with embodiments disclosed herein, the worker 181 may provision the instance 183 with access to a disk image or snapshot corresponding to the task, in a manner that does not require that disk image or snapshot to be fully transferred to local storage of the worker 181 prior to use. Rather, the worker 181 may provide to an instance 183 what appears to be full local access to the disk image or snapshot, while "lazily" retrieving portions of that image or snapshot in response to a request to read such portions. In one embodiment, apparent full local access is provided by a file system process 184, which illustratively represents a FUSE module executing within the user space 182. The file system process 184 may illustratively accept read requests from the instance 183, and interact with a local object manager 188 of the worker 181 to obtain the requested data. To facilitate read requests, the file system process 184 is provided access to an image manifest 186, which illustratively lists a set of portions (e.g., data objects) that collectively represent the disk image or snapshot. For example, the manifest 186 may include a set of identifiers of the portions, a particular root 194 of the object storage system 190 in which the portions are stored, encryption keys by which each portion is encrypted, and information mapping particular logical locations within the disk image or snapshot (e.g., logical block addresses, or "LBAs") to particular portions. Thus, on receiving a request to read a given range of bytes of a disk image or snapshot, the file system process 184 may, from the request and the manifest 186, identify a particular portion storing the range of bytes, and may request access to that portion from the local object manager 188.

The local object manager 188, in turn, represents code executing on the worker 181 and configured to provide the file system process 184 with access to the requested portion. For example, the local object manager 188 may obtain a request to access a portion, and if the portion is not available within a cache, retrieve that portion from an object root 194 (which root 194 may be identified within the request). On retrieving the portion, the portion may be placed within the object cache 189, which represents "level one" cache of the local object manager 188 (though note the instance 183 itself may implement caches, such as a "page cache" of read data). In one embodiment, the object cache 189 represents a memory-mapped file on a file system of the worker 181, which may be stored for example on high speed storage of the worker 181 to facilitate rapid access by file system processes 184. For example, the object cache 189 may be stored wholly or partly within RAM of the worker 181, and wholly or partly within other high speed storage (e.g., a solid state drive (SSD), 3D XPOINT memory, flash memory, etc.). The object cache 189 may be sized such that it can hold hundreds, thousands, or millions of portions. For example, individual portions may be 512 kb objects, while the cache 189 is hundreds of gigabytes or terabytes in size. On retrieving a requested portion, the local object manager 188 may place the portion into the object cache 189 and return to a requesting file system process 184 a pointer to a location within the cache 189 holding the portion. The process 184 may then read the portion from the location, thus enabling satisfaction of a read request from a VM instance 183.

In one embodiment, each instance 183 is associated with a distinct file system process 184 within its respective user space 182, while each worker 181 includes a single local object manager 188 and object cache 189. Accordingly, multiple instances 183 may gain shared access to the object cache 189. As noted above, multiple data sets of different tasks may overlap with respect to at least some portions. Thus, shared access to the object cache 189 can significantly reduce "cache misses" by enabling a portion retrieved based on a request from one instance 183 to also service requests from another instance 183. For example, where two instances 183 utilize the same operating system, it is likely that a significant percentage of their respective disk images—the portion storing the operating system—overlap. Thus, portions of the disk image would also be expected to overlap, and executions of the two tasks may effectively share access to those portions within the object cache 189. In some instances, the object cache 189 may be "seeded" with commonly used portions prior to execution of any tasks, such as by storing within the cache 189 portions associated with commonly used operating systems, runtimes, libraries, etc. In some instances, these seeded portions may be exempted from cache eviction policies that might otherwise be applied to the cache 189 by the local object manager 188. Portions within the object cache 189 are illustratively maintained as "read only," such that an instance 183 is unable to modify the portion. Nevertheless, a corresponding disk image or snapshot may in some instances be viewed as writable by instances 183. For example, the file system process 184 may provide the disk image or snapshot using a "copy on write" mechanism, whereby an attempt to write to the disk image or snapshot by the instance 183 causes a modified version of the image or snapshot to be stored in other storage.

The local object manager 188 may, during operation, manage the cache 189 to ensure proper operation. For example, the manager 188 may implement a cache eviction policy, such as deleting one or more least-recently-read portions when storage space of the cache 189 falls below a threshold level. To facilitate cache eviction, the manager 188 may maintain a "reference count" for each portion, indicating a number of instances 183 reading a given portion. For example, each request from a file system process 184 to read a portion may increment a reference count for the portion, while a "close" operation from a process 184 or failure of the process 184 (e.g., a crash) may decrement the reference count. As such, the object manager 188 may maintain information as to which portions are currently in use, in order to facilitate cache eviction.

The file system process 184 and local object manager 188 may communicate via any number of known intra-device techniques. For example, each process 184 may, on initialization, create a Unix socket connection to the manager 188 to facilitate communication.

In addition to the object cache 189 on a given worker 181, the local object manager 188 of FIG. 1 also has access to a level two cache, provided by a set of distributed level two cache devices 170. Each device 170 illustratively represents a server configured to store erasure-coded parts of objects used by the local object manager 188 (e.g., each object being a portion of a data set, such as a disk image or snapshot). Erasure-coded parts are stored within an object part store 172, which may be any persistent or substantially persistent storage of the devices 170. The level two cache devices 170 illustratively provided the local object managers 188 with higher bandwidth access to data that the object storage system 190, such as by being located close to the worker fleet 180 in terms of network distance, having higher speed data storage or network connections, etc. As discussed above, rather than directly storing objects (data set portions), each device 170 may store erasure coded parts of objects, such that the object can be recreated with less than all such parts. As discussed in more detail below, storage of parts within the level two cache devices 170 may be controlled by the local object managers 188 of each worker 181. For example, on retrieving an (uncached) object from the object storage system 190, a local object manager 188 may erasure-encode the object into multiple parts, and then store those parts on a set of devices 170. When another worker 181 desires to retrieve the object, the local object manager 188 of that worker 118 may retrieve the necessary parts of the object from those devices 170 and re-create the object from the parts, thus avoiding delay associated with retrieval of the object from the object storage system 190.

In addition, the system 110 includes a number of components for facilitating distribution of calls to execute a task from frontends 120 to particular VM instances 183. For example, the serverless code execution system 110 includes one or more worker managers 140 configured to manage execution environments (e.g., virtual machine instances) hosted by workers 181 among a worker fleet 180. The worker managers 140—each of which are illustratively implemented as physical or virtual-on-physical devices—illustratively "lease" particular VM instances 183 within the fleet 180, thus gaining operational control to, for example, instruct virtual machine instances 183 to execute code of the task. Thus, on receiving a call to execute a task, a frontend 120 may distribute the call to a worker manager 140, which may identify a currently-leased VM instance 183 in which to implement the task, and cause the instance 183 to implement the task. Example interactions for distributing a call from a frontend 120 to a worker manager 140 are described, for example, in U.S. patent application Ser. No. 16/698,829, entitled "SERVERLESS CALL DISTRIBUTION TO UTILIZE RESERVED CAPACITY WITHOUT INHIBITING SCALING" and filed Nov. 27, 2019, the entirety of which is hereby incorporated by reference.

In the instance that a worker manager 140 does not currently lease a VM instance 183 corresponding to the called task, the worker manager 140 can contact a placement service 160 to request a lease on an additional instance 183, which is illustratively configured to grant to the worker managers 140 leases to individual VM instances 183. Illustratively, the placement service 160 may maintain state information for VM instances 183 across the fleet 180, as well as information indicating which manager 140 has leased a given instance 183. When a worker manager 140 requests a lease on an additional instance 183, the placement service 160 can identify an appropriate instance 183 (e.g., warmed with software and/or data required to support a call to implement a task) and grant to the manager 140 a lease to that instance 183. In the case that such an instance 183 does not exist, the placement service 160 can instruct a worker 181 to create such an instance 183 (e.g., by creating an instance 183 or identifying an existing unused instance 183, storing an appropriate data manifest 186 for a required disk image, snapshot, etc. in a user space 182 of that instance 183, and configuring the file system process 184 to provide access to the required data set) thereafter grant to the worker manager 140 a lease to that instance 183, thus facilitating execution.

In accordance with embodiments of the present disclosure, the placement service 160 may also act to notify the root manager 192 on creation of an instance 183 using a particular data set. For example, the placement service 160 may, when gathering state information indicating currently leased instances 183, identify one or more data sets that such instances 183 rely on, and notify the root manager 192 that such data sets are being accessed. As discussed in more detail below, the root manager 192 may use this information to facilitate copying of data between roots 194 as well as transitioning of roots 194 between life cycle states.

Figure 2:
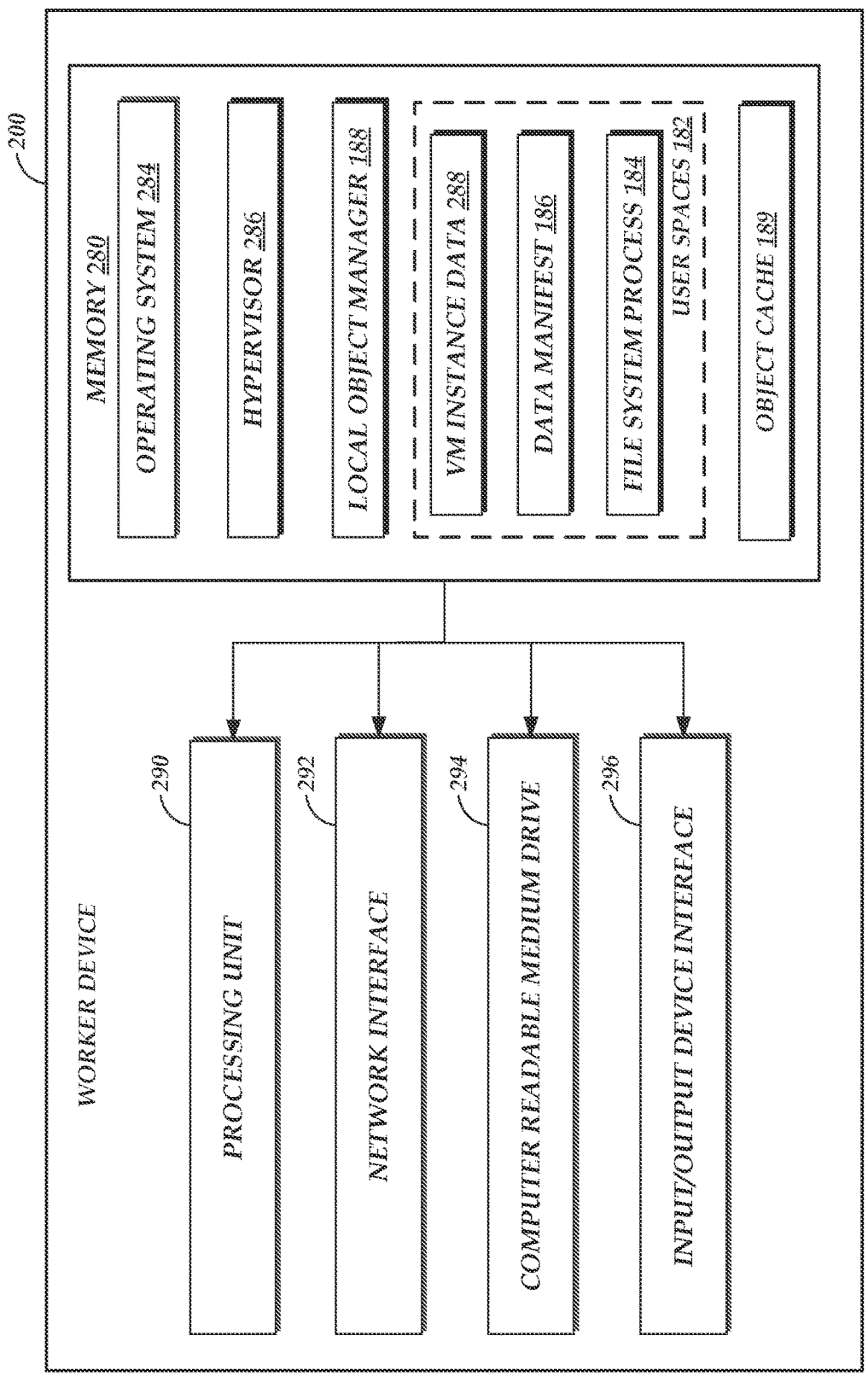
FIG. 2 depicts a general architecture of a computing device providing a worker of FIG. 1, which may host execution environments supporting execution of code and may provide rapid access to data sets relied on by such executions.

FIG. 2 depicts a general architecture of a computing system (a worker device 200) implementing the worker 181 of FIG. 1. The general architecture of the device 200 depicted in FIG. 2 includes an arrangement of computer hardware and software that may be used to implement aspects of the present disclosure. The hardware may be implemented on physical electronic devices, as discussed in greater detail below. The device 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 2.

As illustrated, the device 200 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as units in some embodiments) that the processing unit 290 executes in order to implement one or more aspects of the present disclosure, along with data used to facilitate or support such execution. While shown in FIG. 2 as a single set of memory 280, memory 280 may in practice be divided into tiers, such as primary memory and secondary memory, which tiers may include (but are not limited to) RAM, 3D XPOINT memory, flash memory, magnetic storage, and the like. For example, primary memory may be assumed for the purposes of description to represent a main working memory of the device 200, with a higher speed but lower total capacity than a secondary memory, tertiary memory, etc.

The memory 280 may store an operating system 284 that provides computer program instructions for use by the processing unit 290 in the general administration and operation of the device 200. The memory 280 may further include computer program instructions and other information for implementing aspects of the present disclosure. For example, in one embodiment, the memory 280 includes a hypervisor 286 to facilitate creation and management of virtual machine instances 183. While shown as distinct from the operating system 284, the hypervisor 286 and operating system 284 may in some cases be combined. For example, the operating system 284 may be a LINUX operating system executing a Kernel-based Virtual Machine (KVM) virtualization module that acts as the hypervisor 286.

In addition, the memory 280 includes a local object manager 188, which as described above is configured to handle requests from VM instances 183 to read data from a particular data set, and an object cache 189 representing a set of objects (data set portions) cached locally to the device 200, such as in the form of a memory mapped file. The memory 280 further includes multiple user spaces 182, each of which represents a logically isolated portion of memory 280 associated with a particular VM instance 183. Each user pace 182 illustratively includes VM instance data 288 (data supporting execution of an instance 183), a data manifest 186 that identifies data set portions representing a data set used by a serverless code execution in the instance 183, and a file system process 184 that facilitates interaction between the VM instance 183 and the local object manager 188. In combination, the elements of the memory 280, when executed on the device 200, enable implementation of embodiments of the present disclosure.

The device 200 of FIG. 2 is one illustrative configuration of such a device, of which others are possible. For example, while shown as a single device, a device 200 may in some embodiments be implemented as a logical device hosted by multiple physical host devices. In other embodiments, the device 200 may be implemented as one or more virtual devices executing on a physical computing device. While described in FIG. 2 as a worker device 200, similar components may be utilized in some embodiments to implement other devices shown in the environment 100 of FIG. 2, such as level two cache devices 170, a root manager 192, etc.

Figure 3:
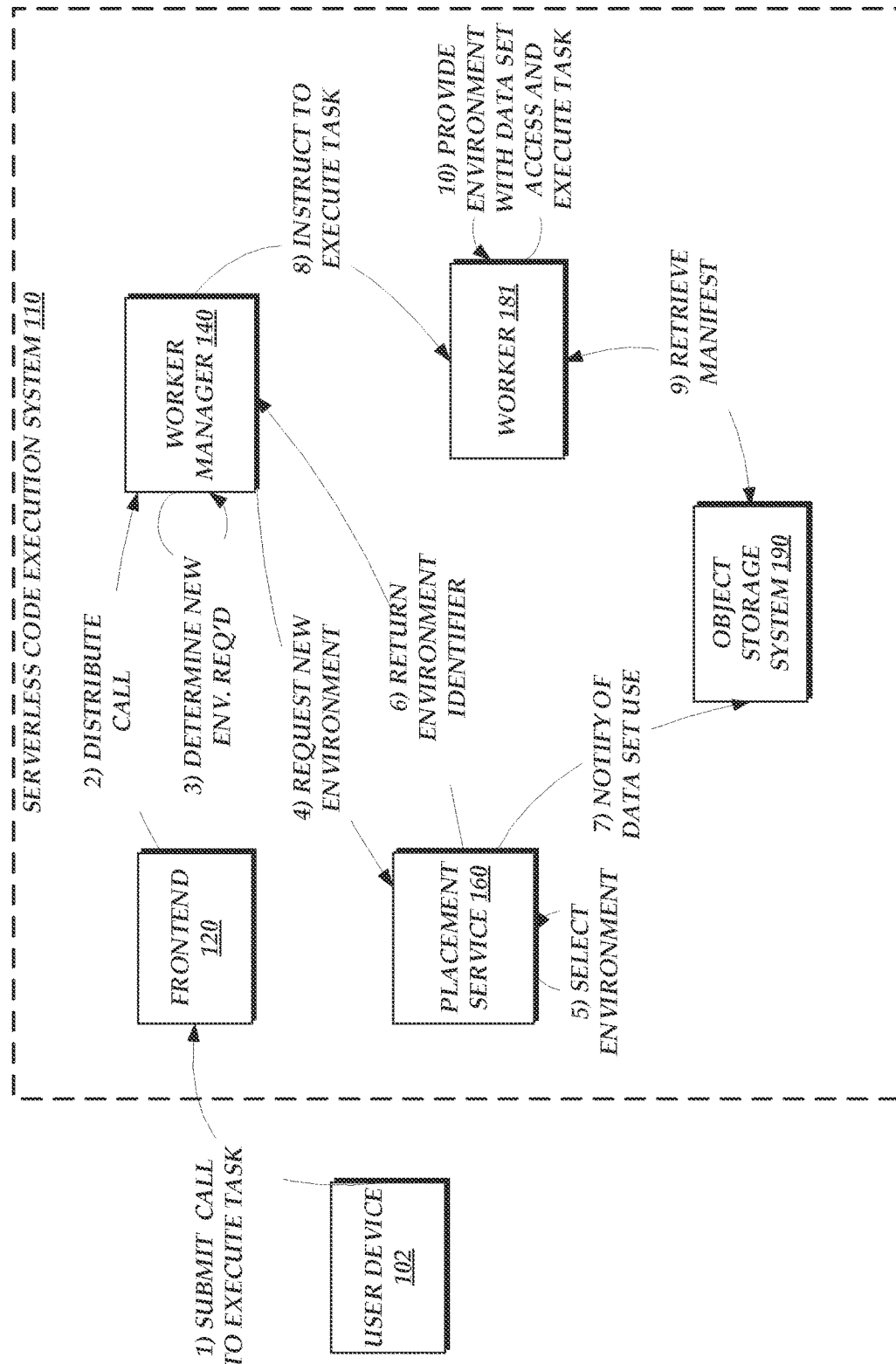
FIG. 3 is a flow diagram depicting illustrative interactions for handling a request to execute code on the serverless code execution system of FIG. 1, including providing an execution environment for the code with rapid access to a data set on which execution of the code relies.

With reference to FIG. 3, illustrative interactions are depicted for handling a request to execute a task on the serverless code execution system 110, including provisioning an environment with lazily-retrieved access to a data set to improve the latency for handling such a request.

The interactions of FIG. 3 begin at (1), where a user device 102 submits a call to the frontend 120 to execute the task. Submission of a request may include transmission of specialized data to the frontend 120, such as a HTTP packet or API call referencing the task. While the interactions of FIG. 3 are described as including an explicit request to execute the task by the user device 102, requests to execute the task may occur in a variety of manners, including submission of a call by auxiliary services 106 (not shown in FIG. 3) or generation of a call by the serverless code execution system 110 (e.g., based on a rule to call the alias when specific criteria are met, such as elapsing of a period of time or detection of data on an auxiliary service 106). The request may include any information required to execute the task, such as parameters for execution, authentication information under which to execute the task or to be used during execution of the task, etc.

At (2), frontend 120 distributes the call to a worker manager 140. The frontend 120 may implement various functionalities to distribute the call, such as selecting the worker manager 140 based on random selection, load, etc. In some instances, the frontend 120 may maintain information identifying a worker manager 140 previously associated with a called task, and distribute the call to that worker manager 140. Various additional functionalities that may be implemented by a frontend 120 to distribute calls to a worker manager 140 are described, for example, in U.S. patent application Ser. No. 16/698,829, entitled "SERVERLESS CALL DISTRIBUTION TO UTILIZE RESERVED CAPACITY WITHOUT INHIBITING SCALING," which is hereby incorporated by reference in its entirety.

In some instances, the worker manager 140 may determine that an appropriate environment (e.g., a VM instance 183) already exists within the worker fleet 180, and may thus execute an instance of the called task within that environment. However, for purposes of the present description, it will be assumed that no such environment exists. Accordingly, at (3), the manager 140 determines that a new execution environment is required to service the call. The manager 140 therefore, at (4), requests the new environment from the placement service 160.

Thereafter, at (5), the placement service 160 selects an appropriate environment (e.g., from among pre-warmed but not yet leased environments of the fleet 180), and returns a response to the manager 140 at (6). The response to the manager 140 may include, for example, identifying information of the environment, which the manager 140 may utilize to instruct the environment to initiate an execution of the called task. The response may further include information identifying a manifest for a data set to be used to support execution of the task, which may be retrieved, for example, from metadata of the task stored on the system 110 (e.g., in the object storage system 190).

In addition, at (7), the placement service 160 may notify the object storage service 190 (e.g. a root manager 192) that the relevant data set (that used to support execution of the task) is in use. As discussed in more detail below, this notification may be used by the root manager 192 to facilitate garbage collection on the object storage system 190. While FIG. 3 depicts notification on selection of an environment, the placement service 160 may additionally or alternatively report data set use periodically. For example, the placement service 160 may be configured to maintain a system-wide view of environments leased among worker managers 140, each of which is linked to a corresponding task, as well as data sets used to support execution of those tasks. Thus, the placement service 160 may periodically determine which data sets are associated with leased environments, and report use of those data sets to the object storage system 190.

While FIG. 3 depicts direct communication between the placement service 160 and the object storage system 190, in some instances the system 110 may include additional elements that facilitate this communication. For example, the system 110 may include a task lifecycle management system (not shown in FIG. 1) configured to maintain state information as to the tasks on the system 110, which state information may include for example a status of the task as "accelerated" (e.g., having associated therewith a data set made rapidly available via embodiments of the present disclosure) or "non-accelerated" (e.g., by not having associated therewith such a data set, either by having no data set associated therewith or having a data set associated therewith that has not been made rapidly available via the present embodiments). Illustratively, a task may enter an "accelerated" state when the appropriate data set for the task has been divided into portions stored within a root of the object storage system 190, such as on creation of the task, and may enter a non-accelerated state after a threshold period of time of non-use, corresponding to expected deletion of the portions from the object storage system 190. Thus, the placement service 160 may transmit the notification at (7) to the task lifecycle management system, which may in turn transmit the notification to the object storage system 190. In some instances, the task lifecycle management system may obtain notifications from the placement service 160 on creation of an execution environment for a task, while the task lifecycle management system may "batch" report notifications of use to the object storage system 190 on a periodic basis (e.g., every 6, 12, or 24 hours).

On receiving information identifying the execution environment, the worker manager 140, at (8), instructs the worker 181 hosting the environment to execute the called task within the environment. The worker 181, in turn, retrieves from the object storage system 190, at (9), a manifest for the relevant data set (e.g., from a location included within the instructions of the worker manager 140). The worker 181 then at (10) provides the environment with access to the relevant data set, and begins execution of the task within the environment. For example, the worker may modify a VM instance 183 as necessary to match a necessary configuration to support execution of the task, and "mount" the data set as a virtual storage drive of the instance 183, or as a file accessible to the instance 183. As noted above, the data set may be provided in a manner that provides complete local access to the data set, but does not actually require complete transfer of the data set to the worker 181 prior to providing that access. Instead, portions of the data set can be retrieved as they are requested from the VM instance 183. Accordingly, providing the environment with access to the data set is expected to incur significantly lower latency than attempting to completely transfer the data set to the worker 181 prior to execution of the task.

The interactions of FIG. 3 are illustrative, and may be modified in some embodiments. For example, the placement service 160 may be responsible for initializing an execution environment on the worker 181. Illustratively, on selection of an environment (e.g., at (5)), the placement service 160 may remotely connect to the worker 181 to configure the environment, including providing to the environment a manifest for the data set, configuring the file system process 184 to provide local access to the data set, and the like. As another example, frontends 120 may in some configurations be configured to pass instructions to execute a task to workers 181. Illustratively, a frontend 120 may, rather than distributing a call at (2), transmit a request to the worker manager 140 to identify an environment on a worker 181 to which the call should be distributed. After identifying that environment (e.g., via interactions (3) through (6)), the worker manager 140 may return to the frontend 120 connection information for the environment, such as an IP address. The frontend 120 can then distribute the call directly to the environment, rather than passing the call through the manager 140. Other modifications to the interactions of FIG. 3 are possible.

Figure 4:
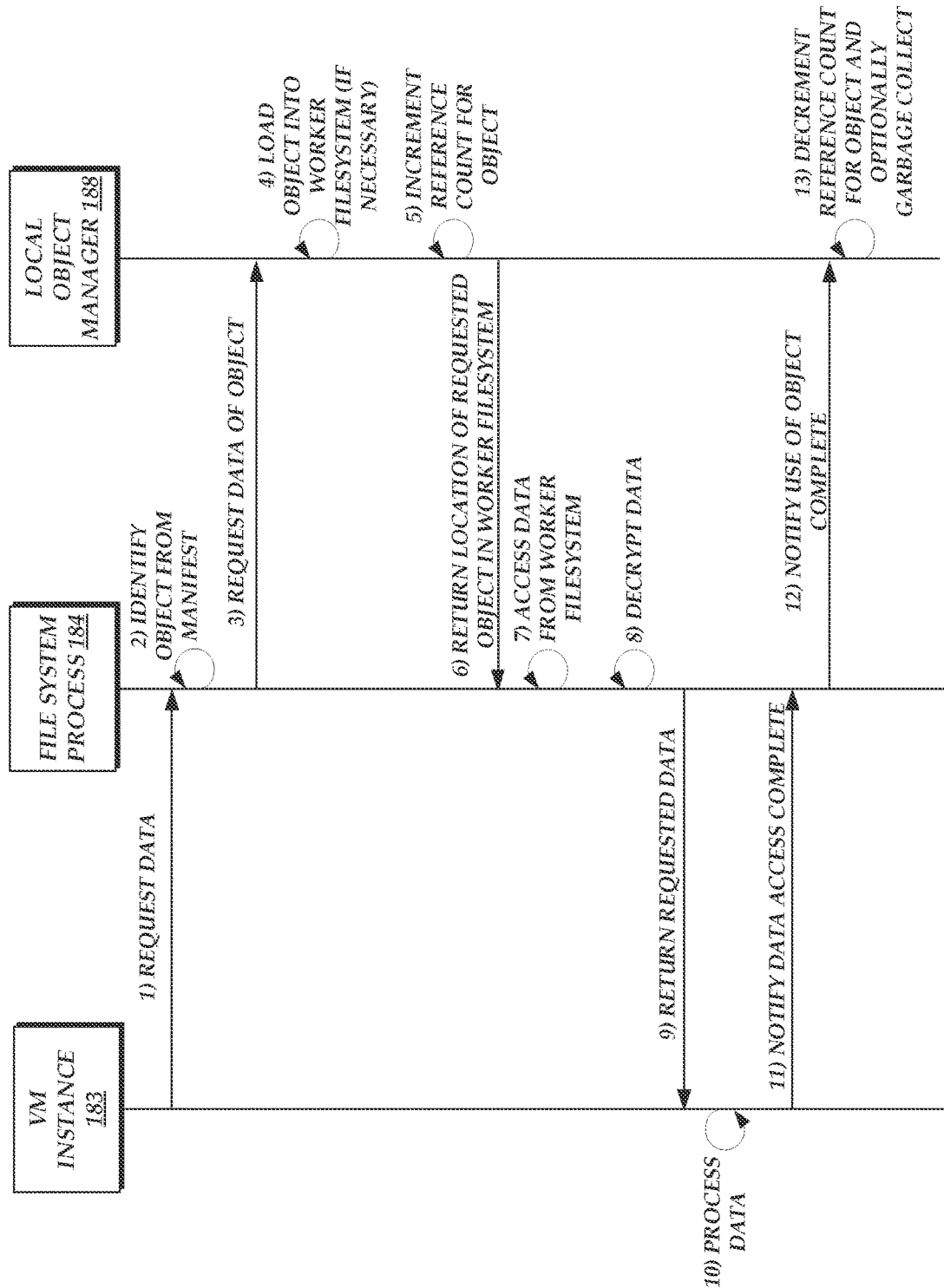
FIG. 4 is a flow diagram depicting illustrative interactions for handling requests to read a data set by an execution environment that has been provisioned with rapid access to the data set.

With reference to FIG. 4, illustrative interactions will be described for reading from a data set by a VM instance 183, in accordance with embodiments of the present disclosure. The interactions of FIG. 4 may facilitate, for example, reading bytes from a disk image to support booting of an operating system or a runtime, execution of code, etc. The interactions of FIG. 4 may similarly facilitate reading from a snapshot to facilitate restoration of a virtual machine state captured in that snapshot.

The interactions of FIG. 4 begin at (1), where a VM instance 183 provided with access to a data set (e.g., via the interactions of FIG. 3) requests to read data of the data set. For example, the VM instance 183 may attempt to read a set of blocks of the data set, identified by a particular location within the data set (e.g., logical block addresses within the disk image). In FIG. 4, the disk image is illustratively mounted as a Filesystem in User Space (FUSE) filesystem. Accordingly, the request is routed (e.g., by the operating system of the worker 181) to the file system process 184, which illustratively represents a FUSE module provided the FUSE filesystem.

At (2), the file system process 184 identifies an object of the object storage system 190 that stores the requested data. As noted above, the file system process 184 can be provided with a manifest that maps locations within the data set (e.g., block offsets) to objects on the object storage system 190, which represent portions of the data set. Thus, by reference to the manifest, the file system process 184 may identify the object. The object may be identified by a name, which illustratively represents a globally unique identifier (GUID) (also known as a universally unique identifier, or UUID) of the object. The name may be generated, for example, as a hash value or media access control (MAC) value of the object. The object may further be identified in the manifest by an object root 194 of the object storage system 190, to facilitate garbage collection on the system 190.

At (3), the file system process 184 then requests data of the object from the local object manager 188 of the worker 181. As noted above, the local object manager 188 can represent a process executing on the worker 181 that facilitates retrieval of objects from a variety of potential sources (e.g., cache levels, an origin, etc.). In one embodiment, the file system process 184 executes within a user space shared with the VM instance 183, while the local object manager 188 executes outside that user space, and the process 184 and manager 188 communicate via a UNIX socket or other intra-device communication system.

At (4), the local object manager 188 loads the requested object into a system of the worker 181, if not already existing therein. Details of this loading are described in more detail below with respect to FIG. 4. However, in brief, the local object manager 188 may maintain a local cache, such as a memory-mapped file, storing multiple objects that have been requested by various VM instances 183 executing on the worker 181. Thus, if the local cache already includes the requested object, the manager 188 may simply use that object without re-loading the object into the cache. If the local cache does not include the object, the manager 188 retrieves the object from one of a variety of potential sources.

As discussed above, the local object manager 188 illustratively provides access to objects to multiple instances 183, and as such an object may be used by more than one instance 183 at a given time. Because space in the local cache is necessarily limited, it may be necessary for the manager 188 to eventually delete one or more objects from the local cache. The manager 188 can therefore be configured to track use of objects by instances 183, to prevent where possible deletion of a currently-used object. Accordingly, at (5), the manager 188 increments a reference count for the object, indicating that the object is being read by the VM instance 183. In one embodiment, a non-zero reference count for an object prevents deletion of the object from the local cache (excepting edge case scenarios, such as the entire cache being filled with objects having a non-zero reference count).

At (6), the local object manager 188 returns to the file system process 184 a location of the requested object in the worker 181 filesystem (e.g., the local cache). For example, where the local cache is a memory-mapped file, the manager 188 may return a bit-range within the file that corresponds to the object. Thereafter, at (7), the file system process 184 accesses the requested data from the indicated location, such as by reading from the indicated bit range. In one embodiment, the file system process 184 is configured to read only a subset of the object corresponding to the data requested to be read. For example, assume that each object is a 512 kilobytes in size, and that the objects in combination represent a disk image storing data in operating-system-level data blocks each of 4096 bytes (4 kilobytes). Each object might therefore contain 128 data blocks. Assuming that the instance 183 requested to read less than all data blocks of an object, the file system process 184 may identify the particular blocks within the object that have been requested, and access only those blocks from the worker filesystem. For example, the worker 181 may identify a particular bit range within the object represented the requested blocks, and read that bit range from the worker filesystem (which particular bit range falls within the broader bit range of the object as stored within the filesystem). Illustratively, if the particular bit range is the first 256 kb of an object, the worker 181 may read the first 256 kb of the bit range for the object as stored in the worker filesystem.

In some embodiments, objects may be stored in an encrypted manner, to preserve data confidentiality. To further this goal, the information required to decrypt each object may be stored in a manifest for a data set, and access to the manifest may be limited to the file system processes 184 that facilitate access to the data set. Accordingly, the local object manager 188 (among other components) may be restricted from reading the data of an object, and the data read by the file system process 184 at (7) may be in an encrypted form. At (8), the file system process 184 thus decrypts the data. In one embodiment, an encryption key for the object is stored within a manifest for the data set. Additional examples regarding storage of the encryption key in a manifest are provided in the '369 Application, incorporated by reference above. Thus, the file system process 184 may retrieve the key for the object from the manifest and decrypt the read data using the key. In one embodiment, the object is encrypted using a block cipher, which can facilitate selective decryption of data from the object as opposed to requiring decryption of the entire object. For example, the file system process 184 may identify particular blocks encrypted using a block cipher, and decrypt those blocks using the encryption key. In the instance that objects are not encrypted, interaction (8) may be omitted.

At (9), the file system process 184 returns the requested data to the VM instance 183. Notably, the VM instance 183's views of the interactions noted above are limited to requesting to read data and being provided with that data, and are thus analogous to those interactions that would occur if the entire data set were stored locally within a user space 182 of the instance 183. These interactions may therefore be implemented without modifying configuration of the VM instance 183, and as such the serverless code execution system 110 may support use of snapshots and disk images generated under existing specifications and not specifically configured for the system 110. However, due to the on-demand retrieval of read data from such snapshots or disk images, the latency associated with use of such snapshots or images at the system 110 is substantially reduced relative to complete transfer of the snapshot or disk image to the worker 181 hosting the instance 183 prior to that use. Moreover, the computing resources used at the worker 181 are reduced, and the efficiency of such use is increased, by enabling multiple instances 183 to share access to individual objects and by loading only those objects that are actually used by an instance 183.

After accessing the data, the VM instance 183 processes the data at (10). Processing of data by a VM instance 183 is outside the scope of the present disclosure, and may correspond to any operations of the instance 183, the scope of which are commensurate with the wide variety of computing processes known in the art.

On completion of processing, the instance 183 illustratively notifies the file system process 184 at (11) that data access has completed. The notification may be generated, for example, by closing a handle to a file of the FUSE filesystem—a typical operation of code after completing use of data. To facilitate garbage collection, the file system process 184 generates a corresponding notification to the local object manager 188 at (12), indicating that the instance 183 has stopped access data of the object. The local object manager 188 thereafter at (13) decrements a reference counter for the object. Assuming that the reference counter has reached zero (indicating that no VM instance 183 is currently reading from the object), the local object manager 188 can then optionally conduct garbage collection with respect to the local cache, such as by deleting the object. Note that garbage collection is an optional process, and the local object manager 188 may in some or many cases maintain objects with zero reference counters. For example, the manager 188 may maintain frequently accessed objects even if such objects are not currently being accessed. The manager 188 may implement a variety of known cache eviction techniques to determine which objects to delete during garbage collection, including but not limited to a "least recently used" (or "LRU") or "least frequently used" eviction policy.

As discussed above, the local object manager 188 is illustratively configured to facilitate retrieval of a data object when access to that object is requested by a file system process 184 associated with a VM instance 183. Illustrative interactions for facilitating such retrieval are shown in FIG. 5.

Figure 5:
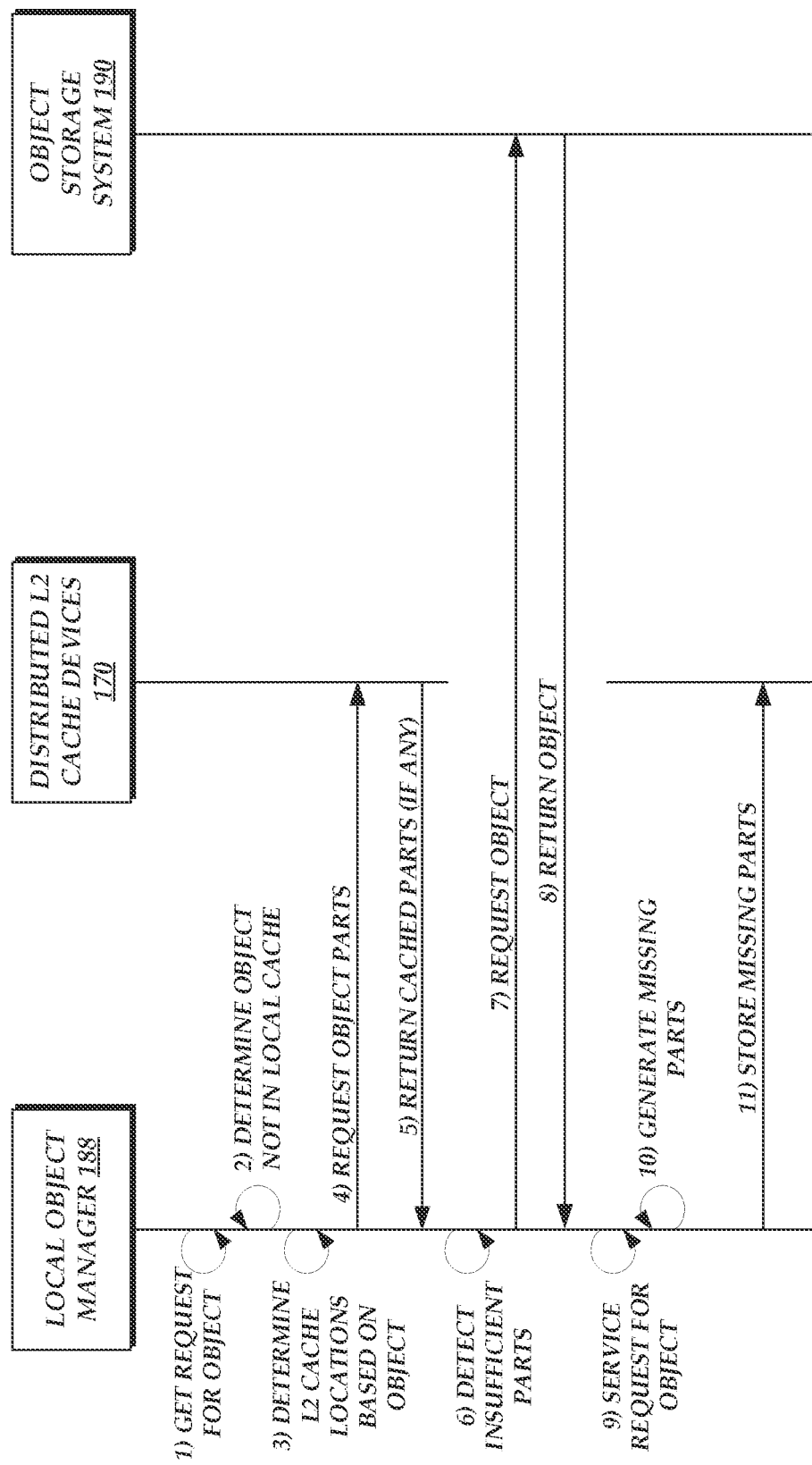
FIG. 5 is a flow diagram depicting illustrative interactions for loading a portion of a data set into storage of worker of FIG. 1 in response to a request to read the portion.

The interactions of FIG. 5 begin at (1), where the local object manager 188 gets a request for an object. The request may be made by a file system process 184 associated with a VM instance 183, as discussed above with respect to FIG. 4. As noted above, the request may include an identifier of the object, as well as an object root 194 on the object storage system 190 that represents an "origin" for the object (e.g., a location from which to retrieve the object if a cached version of the object is not located).

At (2), the local object manager 188 inspects its local cache to determine whether the requested object exists within the cache. For example, the local object manager 188 may maintain a list of currently-cached objects, and may thus inspect the list to determine whether the requested object is cached. If so, the local object manager 188 can service the request for the object from the local cache, and no further interactions are required.

For the purposes of illustration, it is assumed in FIG. 5 that the requested object is not locally cached. As such, the local object manager 188, at (3), determines a set of locations within a level two ("L2") cache storing parts of the object. As noted above, the system 110 may include a L2 cache implemented by a set of distributed L2 cache devices 170. Moreover, rather than directly storing objects within individual devices 170, each object in the L2 cache may be divided into multiple parts using erasure coding techniques, with the number of parts determined according to the particular erasure coding technique applied. Each part of an object may be stored on a different L2 cache device, with the device storing a particular part being determined according to one of a variety of load balancing techniques. In one embodiment, the L2 cache devices 170 are arranged within a consistent hash ring, and individual parts are distributed among the devices 170 according to a hashing algorithm. For example, a hash value of an object may be used to select an initial device 170, and then parts making up the object may be stored on the initial device 170 and the subsequent n−1 devices of the ring. As another example, the hash value of each part may be calculated and used to select a device 170 in the ring with responsibility for storing the part. Each local object manager 188 may store information enabling determination of the devices 170 hosting a given part, such as by implementing the same algorithm at each manager 188. Thus, storage of a part by a first manager 188 at a given device 170 would be expected to enable retrieval of that part by a second manager 188 from the L2 devices 170.

After determining L2 cache locations, the local object manager 188, at (4), requests object parts from the determined L2 cache locations. The distributed L2 cache devices 170, in turn, return the requested object parts if stored in the L2 cache locations. Should the object not be stored, an L2 cache device 170 may return an "object not found" indicator. In one embodiment, the L2 cache devices 170 do not themselves implement "cache miss" handling, and do not attempt to retrieve a requested part from another location. Thus, implementation of the L2 cache device 170 is simplified relative to other caching techniques.

In the case that a threshold number of parts is retrieved from the L2 cache devices 170 (the threshold representing a minimum number of parts needed to recreate the object from erasure coded parts), the local object manager 188 can be configured to recreate the object from the parts and return the object to the requesting process. However, for the purposes of illustration, it is assumed in FIG. 5 that the manager 188 has not obtained the threshold number of parts. As such, at (6), the manager 188 detects that an insufficient number of parts has been retrieved. Not that this may indicate any number of parts below the threshold, including zero parts. Interaction (6) may illustratively be based on positive indications from one or more devices 170 that the requested parts are not cached, a lack of indication from a device 170 within a threshold period, or a combination thereof.

On detecting that insufficient parts are stored in L2 cache devices 170, the local object manager 188, at (7), requests the object from the object storage system 190. As noted above, an initial request for an object may include designation of an object root 194 of the object storage system 190 that contains the object. The root may be identified, for example, as a logical directory of the system 190 containing the object. Thus, the manager 188 illustratively requests the object from the identified root 194. The system 190, in response, returns the object at interaction (8).

On obtaining the object, the local object manager 188 services the request for the object, such as by loading the object into a local cache and returning a location of the object in that cache to a requesting device (as discussed, e.g., above with reference to FIG. 4). The initial request for the object is therefore satisfied.

To facilitate subsequent requests for the object, the local object manager 188 is further illustratively configured to store the object within the L2 cache as a set of erasure-coded parts. Thus, at (10), the local object manager 188 conducts erasure coding against the object to generate those parts that were detected to be missing from the L2 cache at interaction (6). For example, the object manager 188 may generate all parts for the object (if no parts were received). In some instances, where some but not all parts are received, the manager 188 may generate only those parts not received from L2 cache devices 170. At interaction (11), the manager 188 stores the parts in the appropriate L2 cache devices 170, which may be identified according to the location techniques noted above. Thus, subsequent requests for the object at the local object manager 188, or at other managers 188 associated with the L2 cache, may be serviced from the L2 cache without requiring retrieval from the object storage system 190.

While FIG. 5 discusses a distributed L2 cache storing erasure-coded parts of objects, other configurations of L2 cache are possible. For example, an alternative L2 cache may use devices 170 that store entire objects, rather than erasure-coded parts. However, use of erasure-coded parts may provide a number of benefits. For example, erasure coding, as recognized in the art, enables resiliency in the case of failure by enabling an object to be re-created by less than all parts of the object. Moreover, in accordance with the present disclosure, erasure coding of parts can reduce "long tail" latencies for retrieval of objects by enabling creation of the object prior to retrieving all parts of the object, even if no outright failure has occurred.

As an illustration, consider an erasure coding that generates 5 parts from an object, and can tolerate a failure of 1 part. Further assume the parts are of different types, for example with 4 parts holding the actual data of the object and 1 part representing parity values for the 4 parts. One technique for using such parts would be to request the 4 parts holding the actual data of the object. Should any 1 part not be retrieved, an additional request for the parity data (the $5^{th}$ part) could be made, and used to reconstruct the object from the 3 data-holding parts and the parity data part. This technique significantly increases latency, as the first four requests must complete (or time out), and then a fifth request (for the parity data) must be made. Thus, this technique provides resiliency but does not improve long tail latencies.

In accordance with embodiments of the present disclosure, the manager 188 may address this problem by simultaneously requesting all parts of the object, without regard to potential types. The manager 188 may further be configured to begin constructing the object as soon as a threshold number of parts are retrieved, without respect to whether outstanding requests for remaining parts exist. If it is assumed that response times of L2 cache devices 170 fall into a distribution, the latency of operation of the manager 188 can thus be reduced by effectively ignoring the latency of the last m devices 170, where m is the loss tolerance of the implemented erasure coding scheme (e.g., the specific mechanism of erasure coding being implemented, a variety of which are known in the art). In this manner, potential "long tail" scenarios (in which the distribution has a minority of requests that take excessively long times) are mitigated. Accordingly, even if some L2 devices 170 experience partial or total failures (up to the loss tolerance of the implemented erasure coding scheme), these failures would be expected not to increase the latency of operation of the manager 188 in obtaining the object. Thus, use of erasure coding as described herein can provide significant benefits relative to directly caching objects.

As discussed above, the number of objects stored on the system 110 to facilitate embodiments described herein may be large. Moreover, constant storage of these objects may not be strictly necessary to support operation of the serverless code execution system 110. For example, snapshots of VM instances 183 may facilitate rapid provisioning, but provisioning may nevertheless occur without such snapshots. Similarly, while storing a disk image as a set of portions may provide the benefits noted herein, the system 110 may additionally store the disk image as a single object on the object storage system 190, and thus it may be possible for the system 110 to recreate such portions at a later time if the portions are deleted. To balance use of computing resources to store portions against the improved performance realized by storing portions, the object storage system 190 may therefore be configured to store portions for recently used data sets while not storing portions for not-recently-used data sets.

To facilitate this operation, the object storage system 190 in one embodiment implements life cycled object roots 194, in which garbage collection occurs at a root 194 level, rather than attempting to remove individual portions or data sets. Each root 194 may exist within a particular life cycle state, and objects within the root 194 may be removed during a final life cycle state. In this way, the system 190 may avoid a need to maintain state information as to, for example, the last time at which an individual data set (or portion thereof) was used.

Figure 6:
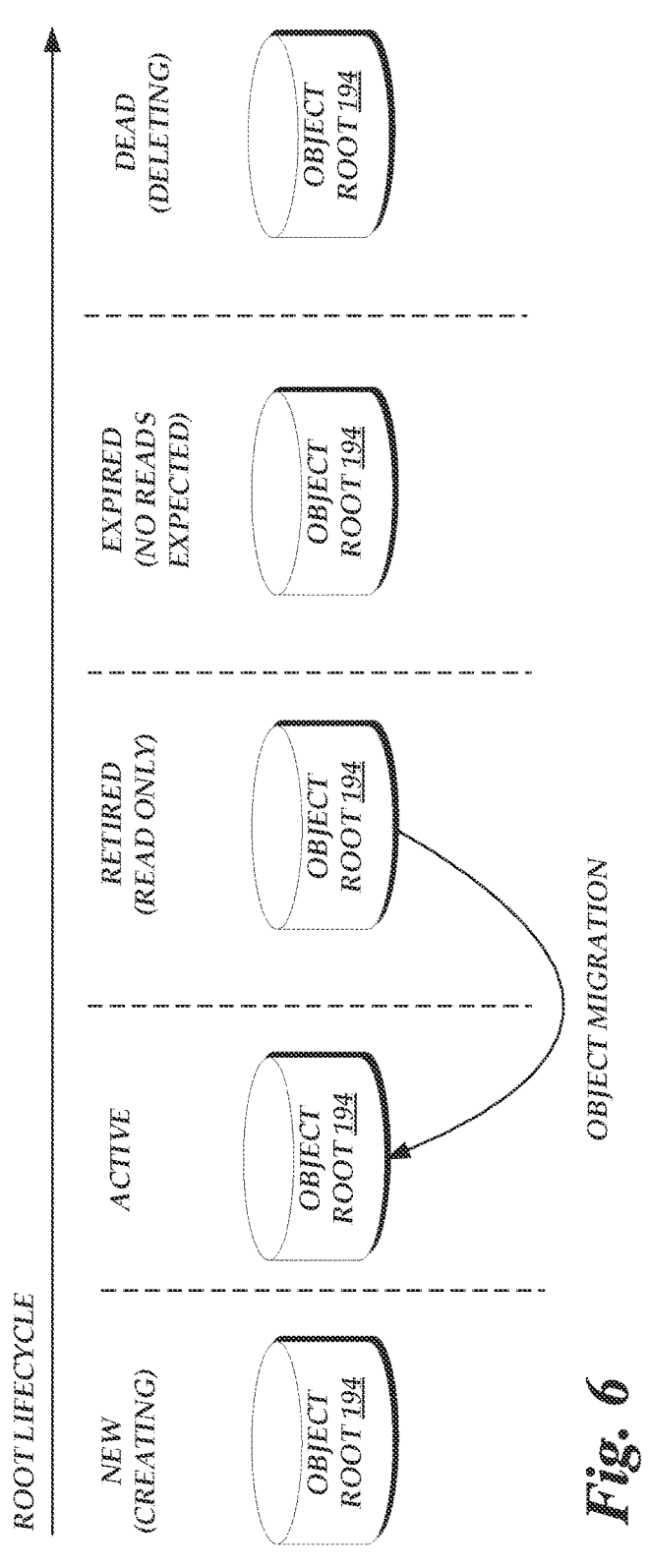
FIG. 6 is a visualization of a lifecycle for a data storage root, in which data sets may be stored to support execution of code on the serverless code execution system of FIG. 1 while also enabling garbage collection on such data sets.

An example visualization of root 194 life cycle stages is shown in FIG. 6. As shown therein, each root 194 may transition through the following stages: New (Creating); Active; Retired (read only); Expired (no reads expected); and Dead (deleting). In one embodiment, the life cycle is one directional, and roots 194 are permitted to progress only in the direction shown in FIG. 6. The illustrative life cycle stages may be described as follows:

New (Creating): This stage indicates that the system 190 is in the process of creating a root 194, such as by provisioning storage space on the system 190 to store data objects, populating the root 194 with any initial data objects, and the like. In this stage, the root 194 is not yet available for reading from or writing to.

Active: This stage indicates that the system 190 has completed creation of the root 194. New objects may be written to the root 194, such as in connection with creation of a new task on the system 110 or division of a data set for a task into portions to facilitate rapid execution of a task. Objects may be read from the root 194, such as to support execution of tasks. Roots 194 may be held in this stage for a predefined period of time selected as appropriate for garbage collection. For example, roots 194 may be held in the active stage for 1 day, 7 days, 14 days, 30 days, etc., before transitioning to a retired state.

Retired (read only): This stage indicates that the system 190 has initiated garbage collection on the root 194, and is maintaining the root 194 to determine which (if any) objects in the root 194 are in use by environments of the system 110. Because some objects may still be in use, the root 194 supports reading of objects. However, writing of new objects to the root 194 is disallowed. An indication of use of an object within a retired root 194, such as provisioning of a new execution environment with a data set including the object, illustratively results in copying of the object to an active root 194. Thereafter, subsequent environments provisioned with the data set can be supported by the copy in the active root 194. Thus, reads from a retired root 194 are progressively reduced during this stage. Roots 194 may be held in this stage for a predefined period of time as appropriate for garbage collection (e.g., 1, 7, 14, or 30 days as noted above), before transitioning to an expired state. In one embodiment, reading from a retired root 194 prevents the root 194 from transitioning to an expired state for a subsequent period. Thus, transition to an expired state is expected to occur only when no objects are being read from the retired root 194.

Expired (no reads expected): This stage indicates that the system 190 has determined that no objects within the root 194 are still in use by execution environments, and thus that the root 194 may be safely deleted. However, the system 190 may maintain the root 194 in an expired state as a failsafe, in case objects of the root 194 are still in use by other processes. For example, the system 190 may, during a retired lifecycle stage, respond to use notifications for an object by copying that object to a new active root. In some cases, such a copy operation may still be occurring when a root transitions from the retired state. Thus, the root can be held in an expired state to ensure that such copy operations completed. Use of an expired state can further provide certainty that all elements of the object storage system 190 have halted use of objects within the root, which may be difficult to confirm given the distributed nature of the object storage system 190. In some embodiments, reading of an object from a root 194 in this stage may indicate an error on the system 190, and may pause life cycle migration of the root 194 until the error is resolved. Should no reads from the expired root 194 occur, the root 194 then transitions to a dead stage after a predefined period of time as appropriate for garbage collection. In some instances, the predefined period may be set relative to entering the expired state (e.g., n hours after initially becoming expired). In other instances, the period may be set relative to a last detected operation relating to an object in the root (e.g., n hours after a last copy of an object from the root completes). In one embodiment, execution environments may be precluded from reading data from an expired root, to further prevent load on that root. As such, reads from expired roots may be limited, for example, to migration of data to an active root.

Dead (deleting): This stage indicates that the system 190 is in the process of deleting the root 194, including all objects stored within the root 194. Deletion of the root 194 thus constitutes garbage collection with respect to those objects. On completion, the root 194 is removed from the system 190.

The stages noted above are provided for illustrative purposes, and the life cycle of a root 194 may vary from these stages. For example, the "expired" stage may be omitted in some embodiments, such as those in which certainty can be achieved that the root leaves the retired state only after all operations regarding data in the root complete. In one embodiment, a single root 194 is maintained in the active stage at any time. For example, a new active root 194 may be created when transitioning of a current active root 194 to a retired stage. In other embodiments, multiple roots 194 are maintained in the active stage, and objects are divided among the roots 194 according to any of a number of load balancing techniques. For example, a first root 194 may store objects with a first range of identifiers, and a second root 194 may store objects with a second range of identifiers.

Figure 7:
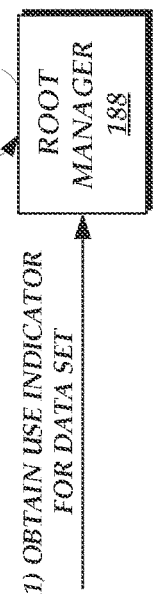
FIG. 7 is a flow diagram depicting illustrative interactions for managing root states according to the lifecycle shown in FIG. 6.

In general, objects may migrate between retired and active roots 194 in the manner shown in FIG. 6. Migration of objects is illustratively controlled by a root manager 188, with illustrative interactions for migrating objects being shown in FIG. 7. In the embodiment of FIG. 7, objects are copied between roots 194 at the level of individual data sets. As noted above, each data set may be associated with a manifest that indicates a set of objects making up the data set. In this example embodiment, the manifest for a data set is stored within a root 194 alongside the set of objects making up the data set. When a new execution environment is to be provisioned with a data set, a component of the system 110 (e.g., the placement service 160) may determine a youngest-stage root 194 containing the data set (e.g., the manifest and corresponding objects), and instruct a worker 181 to use the manifest in order to provision the environment with access to the data set. The placement service 160 may further notify the root manager 188 of use of the data set within the determined root 194. In one embodiment, the placement service 160 submits such notifications on each leasing of an environment. In another embodiment, the placement service 160 submits such notifications periodically, listing all data sets associated with leased environments and their associated roots 194. These notifications are shown in FIG. 7 as received at the root manager 188 at interaction (1).

At interaction (2), the root manager 188 then migrates in-use data sets that exist within a non-active root 194, if any. For example, the root manager 188 may iterate through the use notifications to determine a life cycle state of the root 194 associated with each notification. If the root 194 is in an active state, the root manager 188 may take no action. If the root is in an inactive state, such as retired or expired (which in some instances may be considered "sub-states" of a larger inactive state), the root manager 188 may copy the manifest and objects associated with the data set to an active root 194. Furthermore, the root manager 188 may modify the manifest such that the manifest indicates the active root 194 as a location for the objects, rather than the prior root 194. As noted above, in some embodiments objects are shared between data sets. As such, it is possible that a subset of the objects of a data set being copied already exist within the active root 194 (as part of an already-migrated data set, for example). The root manager 188 may therefore copy only objects not already present within the active root 194. Subsequent uses of the data set can thereafter be redirected to the active root 194, thus migrating reads away from non-active roots 194.

Notably, the interactions of FIG. 7 may result in redundancy in storing objects, and may also result in seemingly unnecessary copying of data between roots 194. That is, if an object is continuously used, the interactions of FIG. 7 can result in the object being continuously copied between roots 194 as those roots 194 are life cycled. The benefits of this life cycling approach may therefore not be immediately apparent. However, while this copying does result in use of computing resources to copy objects between roots 194, it also enables garbage collection to occur in a manner that overcomes significant hurdles of past techniques. For example, the approach described with respect to FIGS. 6 and 7 removes a need to track a last-used time of individual objects (or even individual data sets). Rather, the use indicators obtained at the root manager 188 may be viewed as a "to do" list of the manager 188, and these indicators may be discarded by the manager 188 after being processed in the manner described above. The amount of state information maintained by the system 190 is therefore substantially reduced. Moreover, because the garbage collection described herein is "coarse-grained" (e.g., occurring at a granularity of a root 194, as opposed to a data set or individual object), the likelihood of error due to incorrect operation is substantially reduced. In this context, "incorrect" operation does not necessarily indicate failures of an individual process, but rather the difficulty of reference counting within a distributed system. Put in other terms, because of the distributed nature of the system 190, it is difficult for any component to maintain perfect information as to the state of the system 190 with respect to an individual object or data set. Thus, fine-grained garbage collection may be particularly susceptible to incorrect operation. Moreover, the amount of data copied between roots 194 may be limited in practice due to the nature of operation of the serverless code execution system 110. For example, end users may frequently modify their tasks, such that tasks on average have a usage life span of only a few weeks or days. By setting a life span of an active root 194 commensurate with this average usage life span (e.g., as a 7 day active root 194 life span when tasks have a 5-10 day usage life span), the proportion of data copied between roots 194 can be reduced to an acceptable level, particularly given the benefits of this approach with respect to reduction in errors.

Figure 8:
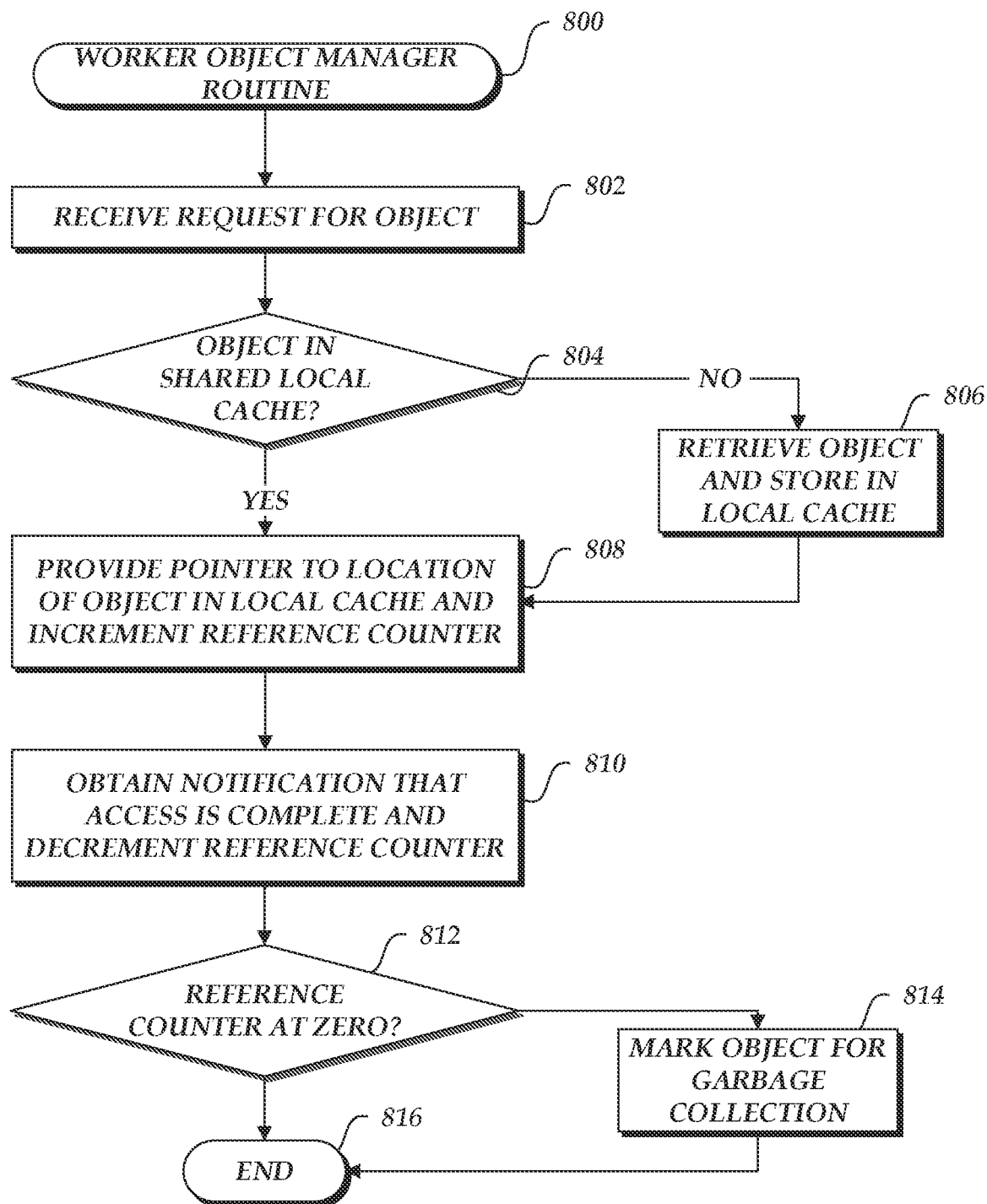
FIG. 8 is a flow chart depicting an illustrative routine for management of objects on a worker of FIG. 1, to provide rapid access to data sets enabling executions on the worker.

With reference to FIG. 8, an illustrative routine 800 will be described for management of objects on a worker 181 to facilitate rapid access to a data set relied on to support execution of a task within an execution environment of the worker 181. The routine 800 may be executed, for example, by the local object manager 188.

The routine 800 begins at block 802, where the manager 188 receives a request for an object. The request may be generated, for example, by a file system process 184 associated with a VM instance 183 hosting execution of a task, such as by the instance 183 issuing a "read" of a data block within a data set. As noted above, the file system process 184 may provide the data set as a virtualized storage device (e.g., a mounted drive), and may thus translate (e.g., using a manifest for the data set) requests to read from the storage device into a request for an object containing the requested data. The request illustratively includes a an identifier of the object, such as a hash value of the object, MAC of the object, or other unique identifier, and a location of the object, such as within a directory within a root 194 containing the object.

At block 804, the manager 188 determines whether the object exists in a shared local cache. As discussed above, the shared local cache represents memory available to the manager 188 and a reading process, such as the file system process 184. For example, the shared local cache may be a memory-mapped file on a storage device of the worker 181, which file is accessible to the process 184. The manager 188 illustratively maintains a listing of objects within the local cache to facilitate implementation of block 804. As discussed above, the local cache may be shared among all processes 184 on the worker 181, and objects may be shared among different data sets associated with different tasks. As such, the local cache may have previously been populated with the requested object, such as by implementation of the routine 800 with respect to the currently requesting file system process 184 or another process 184 associated with another task execution. In some instances, the local cache may be pre-populated with objects independent of requests from processes 184, such as by pre-populating the cache with objects shared among a large number of data sets of commonly executed tasks. Examples of such objects include, for example, objects representing data of a commonly used operating system, library, utility, etc.

In the instance that the cache contains the requested object, the routine 800 proceeds to block 808 as discussed below. In the instance that the object does not exist within the cache, the routine 800 proceeds to block 806, where the manager 188 retrieves the object and stores it in the local cache. Retrieval of the object may include, for example, retrieval of the object from the root 194 location included within the initial request. In some instances, retrieval of the object may include retrieval from a second level cache, such as via the routine 900 discussed with reference to FIG. 9, below.

After the object exists within the local cache, the manager 188 at block 808 provides to the requesting process 184 a pointer to a location, within the local cache, that includes the object. For example, where the cache is a memory mapped file, the manager 188 may return a memory pointer, within the file, that corresponds to a start of the requested object, as well as a length of the object within the file. The process 184 can therefore access the file at the location of the memory pointer, and read the file to access data of the object. As discussed above, the process 184 in some instances is configured for security purposes not to read the entire object, even though such object is accessible, but rather to read only a portion of the object requested by its respective requesting process (e.g., VM instance 183). The process 184 may additionally decrypt the read portion of the object, if such object is handled by the manager 188 in an encrypted form (again for security purposes).

In addition, at block 808 the manager 188 increments a reference counter for the object. The reference counter is illustratively used by the manager 188 to ensure that an object is not removed from the local cache while still being accessed by the process 184. Because the routine 800 may be implemented for each request of an object (with multiple instances of the routine 800 potentially implemented concurrently), and because objects may be shared among different processes 184, it is possible at block 808 that the reference counter for the object is non-zero, indicating that another process 184 also is currently accessing the file. Thus, using a reference counter (as opposed for example to a binary "referenced" or "non-referenced" status) can assist in tracking the number of processes 184 accessing an object.

At block 810, the manager 188 obtains a notification that access to the object is complete. The notification may be generated, for example, by a "close file" operation of a VM instance 183, indicating for example that the instance 183 has read the requested data and no longer requires access to that data. In another embodiment, the notification may correspond to a closing of a connection to the process 184 that requested the file, which may indicate for example a crash of the process 184 or other non-graceful shutdown. The manager 188, in response, decrements the reference counter for the object.

At block 812, the manager 188 determines whether the reference counter for the object has reached zero, indicating that no processes 184 are accessing the file. If so, the routine 800 proceeds to block 814, where the object is marked for garbage collection. The object can thereafter be deleted from the local cache, freeing up computing resources for other objects. In some instances, deletion itself occurs at block 814. In other instances, deletion occurs based on other factors, such as detection that free space in the local cache reaches a minimum threshold. While routine 800 shows this marking as a distinct step, in some cases a garbage collection process may use the reference counters of each object directly. For example, when a garbage collection process runs, such as in response to detecting a threshold minimum of free space available, the process may delete those objects with zero reference counters.

Thus, shared access to an object is provided on a worker 181 in a manner that facilitates rapid access to the data of that object while enabling efficient use of storage on the worker 181. The routine 800 then ends at block 816.

As discussed above, in some instances the system 110 may include a level two ("L2") cache implemented by a distributed set of L2 cache devices 170. The L2 cache may illustratively store objects used by workers 181 within the fleet 180, making such objects accessible to the workers 181 in a manner that is more readily accessible than objects stored in object roots 192. For example, the L2 cache devices 170 may be closer to the workers 181 in terms of network distance, have a connection to workers 181 with more available bandwidth, have additional computing resources available to service requests from workers 181, have more computing resources dedicated to servicing these requests, or the like.

To facilitate rapid retrieval, objects may be stored in the L2 cache as a set of erasure-coded parts, such that only a less than all parts of an object are required to regenerate the object from the parts. Storage of erasure coded parts may, for example, reduce the "long tail" delays that may exist when an individual L2 cache experiences partial or complete failure, and therefore fails to return data or returns such data very slowly relative to a properly functioning device 170.

Unlike some traditional caching mechanisms, objects within the L2 cache may be managed by the consumers of the objects—the workers 181 themselves—rather than by a separate device facilitating interaction with the L2 cache. Thus, individual cache devices 170 may be configured relatively simply, to obtain requests for data stored in a store of the device 170 (e.g., part store 172) and to provide such data if it exists within the store or, if not stored in the store, to return an indication that such data does not exist.

Figure 9:
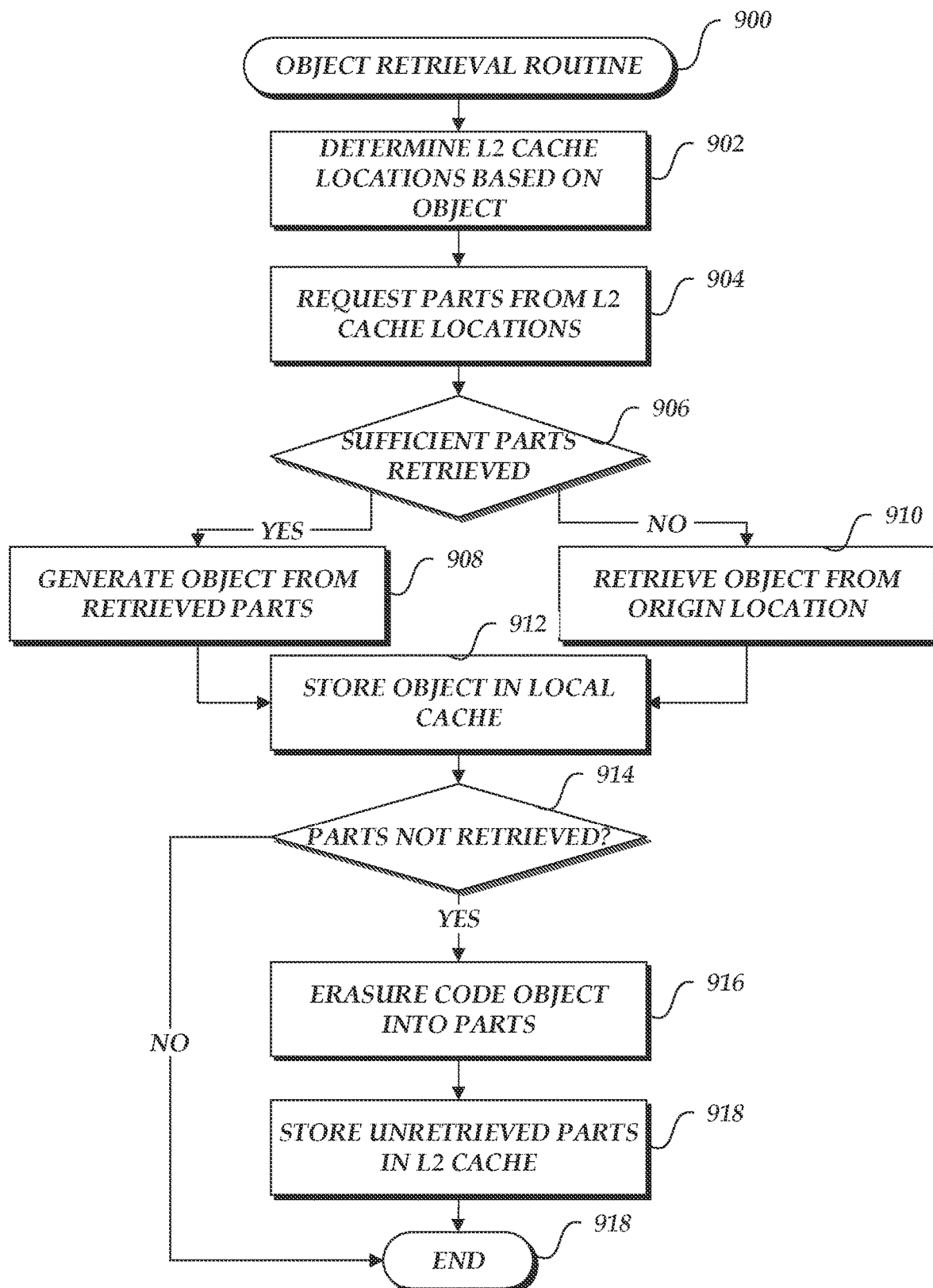
FIG. 9 is a flow chart depicting an illustrative routine for implementing a level two cache of objects used by the workers of FIG. 1, including storage of objects in the level two cache as erasure-coded parts to facilitate rapid retrieval of such objects.

To manage data in the L2 cache, each worker 181 may implement a cache management routine, an example of which is shown in FIG. 9. The routine 900 of FIG. 9 may be implemented, for example, by a local object manager 188. In one embodiment, the routine 900 may be used to retrieve objects not cached within a local cache of the object manager 188, such as to fulfill block 806 of FIG. 8. The routine 900 thus assumes that the manager 188 has identified an object to retrieve, such as an object requested by a file system process 184 in connection with the routine 800 of FIG. 8.

The routine 900 of FIG. 9 begins at block 902, where the manager 188 determines a set of L2 cache locations based on the object. As discussed above, each object may be stored in the L2 cache as a set of erasure-coded parts, with the number of such parts determined according to the particular erasure coding implemented by the manager 188. The present description will assume, for illustration only, that an object is divided into 5 parts, of which only 3 are needed to regenerate the object (a "loss tolerance" of 2 parts). Other numbers of parts and loss tolerances are possible.

In one embodiment, the set of L2 cache locations is determined according to a load balancing algorithm as applied to the object to be retrieved. For example, manager 188 may utilize a consistent hash algorithm to load balance parts among services 170. Illustratively, the L2 cache devices 170 may be logically arranged within a ring, such that each device is associated with a location on the ring. The manager 188 may illustratively determine or calculate a hash value of the object or an identifier of the object (or, where objects are identified by hash values, use that hash value directly) and identity a location on the ring for the hash value. The manager 188 may then determine a "next" device 170 on the ring, and associate that device 170 with a first part of the object, such that the object is stored (and expected to be stored) at that device 170. Subsequent parts may be stored on subsequent devices 170 within the ring, e.g., such that parts 2 through 5 are stored at the $2^{nd}$ through $5^{th}$ devices 170 on the ring, as measured (in a given direction) from the location of the object's hash value. While consistent hashing is provided as an example, any number of load balancing techniques are possible. Each manager 188 can implement the same load balancing technique, such that the locations for parts of an object are deterministic and consistent across managers 188 without requiring coordination among managers 188 (e.g., to communicate regarding storage locations of parts).

On determining locations for parts, the manager 188, at block 904, requests the parts from each cache location (e.g., each L2 device 170 expected to store a corresponding part). The request may be, for example, an HTTP "GET" request for the object, as identified by the object's identifier.

Thereafter the routine 900 varies according to the determination at block 904 if whether sufficient parts are received at the manager 188. In FIG. 9, "sufficient parts" refers to the minimum number of parts required to generate the object from erasure coded parts. For example, in the assumed erasure coding configuration, three parts would be sufficient. In one embodiment, block 904 is re-evaluated as each part is received from a device 170, such that the block 904 evaluates as true directly after sufficient parts have been received, even if outstanding requests for other parts exist and regardless of whether such outstanding requests eventually result in gathering additional parts. As such, the routine 900 need not be delayed awaiting such excess parts. This lack of delay is particularly beneficial in instances where one or more devices 170 take significantly longer to respond to the requests than other devices 170, and where those delayed devices 170 store parts not needed to generate the object. In some embodiments, evaluation at block 906 may similarly be "short circuited" when the manager 188 determines that it is not possible to retrieve sufficient parts. For example, where the loss tolerance of the used erasure coding is 2 parts and the manager 188 receives responses from 3 devices 170 that the relevant parts are not stored therein, the manager 188 may determine that block 906 has evaluated to false without delay while awaiting responses from other devices 170.

In some embodiments, the requests transmitted at block 904 occur simultaneously, with the local object manager 188 transmitting requests for all parts of the object to the identified cache devices 170. This approach can prioritize latency over bandwidth, as it might be expected to result in responses from each cache device 170 with minimal delay, and thus minimize time required to make a determination at block 906. In another embodiment, the manager 188 may transmit requests for only some parts at a first point in time, and transmit requests for a remainder of the parts at a later point in time. For example, it might be expected that a normal response time from the device 170 is a relatively short time period (e.g., ones to tens of milliseconds), while a delayed response time (such as due to congestion, device failure, etc.) is a relatively long time period (e.g., hundreds of milliseconds). The manager 188 may therefore, at a first point in time, transmit requests for only some parts of the object, such as a minimum number sufficient to generate the object. If one or more responses is not received within the expected normal response time window (e.g., 10 milliseconds, where normal responses are expected in under 10 milliseconds), the manager 188 may transmit requests for the remaining parts. By requesting less than all parts initially, bandwidth is conserved where each initial request is responded to within the initial response window. Moreover, by requesting the remaining parts after the normal response window, the total time required to make a determination at block 906 is still reduced relative to other caching techniques, such as storage of an object in a single device 170. For example, assume that one of the devices 170 storing an initially requested object does not respond in the normal response time window (e.g., under 10 ms), and that the manager 188 thus requests remaining parts after that window has passed. Assuming that a sufficient number of devices 170 respond to the requests for remaining parts within the normal time window, the manager 188 may nevertheless make a determination at block 906 in a period of around two times the normal response time window (e.g., around 20 milliseconds). Thus, so long as the expected time window for delayed responses is greater than 2 times the time window for normal responses, this approach of bifurcating requests into two time periods can provide reduced bandwidth usage while still providing for reduced latency relative to a single request for an object stored at a single device 170.

After the determination at block 906, if sufficient parts are retrieved, the routine 900 proceeds to block 908, where the manager 188 generates the object from the erasure coded parts. Specifics for generation of a data item from a set of erasure coded parts varies according to the particular erasure coding technique used, a variety of which are known in the art. Thus, details of such generation are not described in detail herein.

If sufficient parts are not retrieved, the routine 900 proceeds to block 910, where the manager 188 retrieves the object from an origin location. For example, the manager 188 may retrieve the object from a root 194 storing the object. In one embodiment, the request for the object identifies the origin location. In another embodiment, the manager 188 identifies the origin location, such as via interaction with root manager 188 to determine a root 194 in which the object is stored.

At block 912, after generating or retrieving the object, the manager 188 stores the object in the local cache. The object can thus be made available to a requesting device, such as via the routine 800 of FIG. 8.

While block 912 can satisfy requirements that an object is retrieved (e.g., such that other processes awaiting the object, like the routine 800 of FIG. 8 need not be delayed), the routine 900 includes a number of further blocks related to management of the L2 cache. These additional blocks may illustratively be implemented in an asynchronous manner relative to requests for objects handled by the manager 188. For example, the additional blocks may be delayed by the manager 188 until sufficient resources are available at the manager 188 to implement the blocks.

These additional blocks begin at block 914, where the manager determines whether any requested parts (e.g., as requested at block 904) were not received. Notably, block 914 may evaluate as true even when sufficient blocks were received to regenerate the requested object (e.g., block 906 evaluated as true). This is because the L2 cache can benefit from store all parts of an object, not just a minimum number of parts, both for resiliency purposes and for purposes of speeding later retrieval. For example, it is possible that a non-retrieved part is stored at an L2 device 170 that operates more quickly than the L2 devices 170 that provided retrieved parts, thus speeding later implementations of block 906. Block 914 may take into account, for example, parts that were received after block 906 evaluated as true. For example, block 914 may evaluate as false if all parts were retrieved, even if block 906 evaluated as true based on retrieval of less than all parts.

If all parts were retrieved, there may be no need for the manager 188 to re-generate and store parts, and the routine 900 ends at block 918. However, if some parts were not retrieved, the routine 900 proceeds to block 916, where the manager 188 erasure codes the object into at least the unretrieved parts. Specifics for erasure coding a data item into a set of erasure coded parts varies according to the particular erasure coding technique used, a variety of which are known in the art. Thus, details of such erasure coding are not described in detail herein. Thereafter, at block 918, the manager 188 stores the unretrieved parts in their respective locations of the L2 cache (e.g., the devices 170 identified at block 902, from which the parts were not retrieved). Notably, blocks 916 and 918 may account for both situations in which one or more parts of the object were lost among the L2 cache (e.g., due to failure of a device 170) and in which the L2 cache simply lacked a given object (e.g., due to the object not being recently requested). Thus, the previously unretrieved parts are stored within the L2 cache and made available for subsequent implementations of the routine 900. The routine 900 then ends at block 918.

Figure 10:
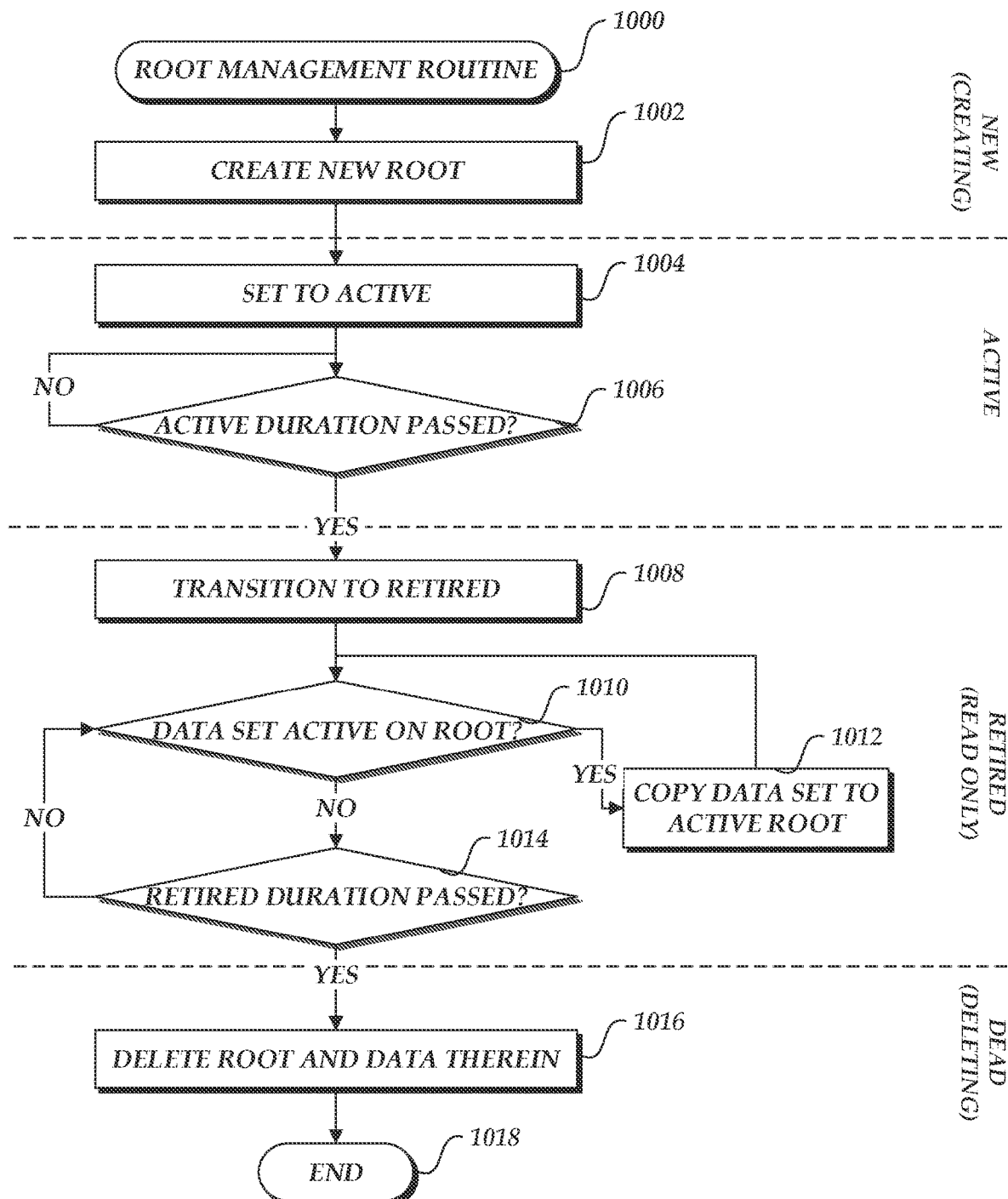
FIG. 10 is a flow chart depicting an illustrative routine managing lifecycles of roots to enable garbage collection of data sets stored within those roots.

With reference to FIG. 10, an illustrative routine 1000 will be described for conducting garbage collection on an object storage system using a life-cycled root. The routine 1000 may be implemented, for example, by a root manager 192 of the object storage system 190 in order to remove unused data from the system 190 and thus reclaim computing resources.

The routine 1000 begins at block 1002, where the root manager 192 creates a new root on the system 190. The root illustratively represents a logical storage location on the system 190, such as a prefix within a hierarchy of storage locations. Creation of the root may include creation of the storage location, and in some instances may further include placement of pre-defined data within the storage location, such as commonly used objects (e.g., commonly referred to portions of data sets).

After creation of a root, the routine 1000 proceeds to block 1004, where the manager 192 sets the root's state to "active." An active state indicates that the root is available for writing to by other components. For example, a frontend 120 may place a data set in the root, such as by dividing the data set into a number of portions and storing the portions as individual objects within the root, along with a manifest identifying the portions. As discussed above, an active root may also be available for reading from on the system 190. During the active stage, the manager 192 may illustratively respond to inquiries regarding active roots by providing an identifier of the active root.

The routine 1000 then proceeds to block 1006, where the manager 192 determines whether an active duration of the root has passed. The active duration may be set by an administrator of the system 190, such as based on a statistical measure for duration of use of data sets on the system 190. For example, the active duration may be established on the order of hours, days, weeks, etc. In one embodiment, the active duration is between 7 and 14 days. If the active duration has not yet passed, the routine 1000 continues to loop until the duration is reached.

Once the active duration has passed, the routine 1000 proceeds to block 1008, where the manager 192 transitions the root to a retired state. During the retired stage, the manager 192 is illustratively configured to stop identifying the root in response to inquiries for active roots, thus halting writing of new data to the root. However, the root may still be available for reading on the system 190.

In addition, during the retired state, the manager 192 may obtain notifications that a data set within the retired root is in fact actively used, as shown at block 1010. Such notifications may include, for example, provisioning a new execution environment with access to the data set, a device reading from the data set, or the like. If a notification is received at block 1010, the routine 1000 proceeds to block 1012, where the manager 192 copies the data set to an active root. In one embodiment, the manager 192 is configured to create a new active root prior to transitioning a currently-active root to a retired state. For example, the routine 1000 may be modified to include, prior to block 1008, a block that initiates an additional implementation of the routine 1000. Copying of the data set may include duplicating the data set in the location corresponding to the new root. In some embodiments, copying of the data set may include deleting the data set from the current root. However, in other embodiments, the data set is maintained in the current root to continue supporting reads of the data set from the current route. As noted above, in some instances data sets may be stored as a set of objects and a corresponding manifest, with at least some objects potentially being shared by other data sets. In these instances, copying of the data set may include referencing the manifest to identify the set of objects to be copied to the new root, and copying those objects within the set that do not already exist within the new root. After copying, the routine 1000 returns to block 1010.

After each active data set is copied to a new active root, the routine 1000 proceeds to block 1014, where the manager 192 determines whether a retired duration for the root has passed. If not, the routine returns to block 1010 until that duration has passed. The retired duration can generally be set according to similar considerations as the active duration. However, the retired duration may differ from the active duration (e.g., longer or shorter than the active duration). In some instances, a single retired duration is used, as measured from the last time at which a data set was indicated as active in the retired root. In other instances, multiple retired durations are used. For example, a first retired duration may be established from implementation of block 1008 (the transition to retired), and a second retired duration may be established from the last time at which a data set was indicated as active in the retired root. In one embodiment, the manager 192 requires all retired durations to have passed before block 1014 evaluates as true.

Thereafter, the manager 192 determines that no data is in active use on the root. Thus, at block 1016, the manager 192 deletes the root and the objects contained therein. Thus, garbage collection on the system 190 is accomplished and storage resources used to store data are reclaimed. The routine 1000 then ends at block 1018.

The routine 1000 is intended for illustration, and variations are possible and contemplated herein. For example, rather than deleting the root at block 1016, the manager 192 may instead mark the root as "garbage," such that another element of the system 190 may later delete the root (e.g., as storage space is required). As another example, while the routine 1000 depicts a 4 stage lifecycle (new, active, retired, and dead), the routine 1000 may be modified to support additional stages, such as an "expired" stage. As discussed above, the expired stage may be used as a failsafe state, to prevent deletion of data still in use. In one embodiment, implementation of an expired state may include insertion of a new block between blocks 1014 and 1016, which inserts a delay in the root lifecycle corresponding to the expired state, with the delay timed to enable any pending operations on data of the root (e.g., copying of a data set to an active root) to complete. In another embodiment, this newly inserted block may be a decision block, that precludes transition to a dead state so long as any process (e.g., a copy process) is utilizing data of the root. In yet another embodiment, implementation of an expired state may be similar to that of the retired state, except that a notification of an active data set within an expired root may be reported as an error. Thus, to implement an expired stage, the routine 1000 may be modified to include another copy of blocks 1008-1014 in between blocks 1014 and 1016 as shown in FIG. 10, and to modify the second copy of these blocks such that, in the second copy, implementation of block 1012 raises an error message to an administrator of the system 190. In still other embodiments, another copy of blocks 1008-1014 in between blocks 1014 and 1016 as shown in FIG. 10, and block 1012 may be modified to raise an error but not to cause copying of the data to an active root. Other modifications to FIG. 10 are possible.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for facilitating retrieval of data objects from a cache storing the data objects as sets of erasure coded parts, the system comprising:
   a plurality of cache devices, each cache device including a cache configured to store erasure coded parts; and
   one or more processors configured to execute computer-executables instructions to:
      obtain a request for a data object;

identify, according to at least an erasure coding scheme corresponding to the data object, a set of cache devices, from the plurality of cache devices, assigned to store a set of erasure coded parts that represent the data object, wherein each cache device of the set of cache devices is assigned to store a corresponding erasure coded part of the set of erasure coded parts;

request, from the set of cache devices, the set of erasure coded parts;

retrieve, from the set of cache devices, a threshold number of erasure coded parts, from the set of erasure coded parts, that is sufficient to generate the data object, the threshold number being less than all of the set of erasure coded parts;

when the threshold number of erasure coded parts is retrieved and while at least one request for an erasure coded part of the set is outstanding, generate the data object from the threshold number of erasure coded parts;

return the data object in response to the request;

obtain a request for a second data object;

identify, according to at least the erasure coding scheme, a second set of cache devices assigned to store a second set of erasure coded parts that represent the second data object;

determine that the second set of cache devices lack a sufficient number of the second set of erasure coded parts to generate the data object; and retrieve the data object from an origin location for the data object.

2. The system of claim 1, wherein the erasure coding scheme establishes the threshold number as either one less or two less than a total number of parts within the set of erasure coded parts.

3. The system of claim 1, wherein the one or more processors are further configured to:

identify at least one erasure coded part of the set of erasure coded parts that is not stored within the cache device of the set of cache devices that is assigned to store the at least one erasure coded part;

erasure code the data object to result in the at least one erasure coded part; and store the at least one erasure coded part in the cache device.

4. The system of claim 1, wherein the plurality of cache devices are arranged into a consistent hash ring, and wherein, to identify the set of cache devices assigned to store the set of erasure coded parts, the computer-executables instructions cause the one or more processors to:

determine a hash value for the data object; and identify the set of cache devices based at least on the hash value for the object and locations of the set of cache devices on the consistent hash ring.

5. The system of claim 4, wherein the set of cache devices are identified as a first n cache device on the consistent hash ring at locations subsequent to the hash value of the data object, where n equals the number of cache devices within the set of cache devices.

6. A computer-implemented method comprising:

obtaining a request for a data object;

identifying, according to at least an erasure coding scheme corresponding to the data object, a set of cache devices assigned to store a set of erasure coded parts that represent the data object, wherein each cache device of the set of cache devices is assigned to store a corresponding erasure coded part of the set of erasure coded parts;

requesting, from the set of cache devices, the set of erasure coded parts;

retrieving, from the set of cache devices, a threshold number of erasure coded parts, from the set of erasure coded parts, that is sufficient to generate the data object, the threshold number being less than all of the set of erasure coded parts;

when the threshold number of erasure coded parts is retrieved and while at least one request for an erasure coded part of the set is outstanding, initiating generation of the data object from the threshold number of erasure coded parts;

returning the data object in response to the request;

obtaining a request for a second data object;

identifying, according to at least the erasure coding scheme, a second set of cache devices assigned to store a second set of erasure coded parts that represent the second data object;

determining that the second set of cache devices lack a sufficient number of the second set of erasure coded parts to generate the data object; and retrieving the data object from an origin location for the data object.

7. The computer-implemented method of claim 6, wherein the origin location is identified within the request for the second data object.

8. The computer-implemented method of claim 6, wherein retrieving the data object from the origin location for the data object begins while at least one request to a cache device of the second set of cache devices for an erasure coded part, of the set of erasure coded parts, is outstanding.

9. The computer-implemented method of claim 6 further comprising:

erasure coding the data object into the set of erasure coded parts;

determine one or more erasure coded parts, of the set of erasure coded parts, not stored on the set of cache devices; and for each erasure coded part, of the set of erasure coded parts, determined not to be stored by the set of cache devices, storing the erasure coded part at the set of cache devices.

10. The computer-implemented method of claim 6, wherein the set of cache devices are arranged into a consistent hash ring comprising a plurality of cache devices, and wherein identifying the set of cache devices assigned to store the set of erasure coded parts comprises:

determining a hash value for the data object; and identifying the set of cache devices based at least on the hash value for the object and locations of the set of cache devices on the consistent hash ring.

11. The computer-implemented method of claim 10, wherein the hash value is an identifier of the data object.

12. The computer-implemented method of claim 10, wherein determining the hash value for the data object comprises passing an identifier of the data object through a hash function.

13. Non-transitory computer-readable media including computer-executable instructions that, when executed by a computing system, cause the computing system to:

obtain a request for a data object;

identify, according to at least an erasure coding scheme corresponding to the data object, a set of cache devices assigned to store a set of erasure coded parts that represent the data object, wherein each cache device of the set of cache devices is assigned to store a corresponding erasure coded part of the set of erasure coded parts;

request, from the set of cache devices, the set of erasure coded parts;

retrieve, from the set of cache devices, a threshold number of erasure coded parts, from the set of erasure coded parts, that is sufficient to generate the data object, the threshold number being less than all of the set of erasure coded parts;

when the threshold number of erasure coded parts is retrieved and while at least one request for an erasure coded part of the set is outstanding, initiate generation of the data object from the threshold number of erasure coded parts;

return the data object in response to the request;

obtain a request for a second data object;

identify, according to at least the erasure coding scheme, a second set of cache devices assigned to store a second set of erasure coded parts that represent the second data object;

determine that the second set of cache devices lack a sufficient number of the second set of erasure coded parts to generate the second data object; and retrieve the second data object from an origin location for the data object.

14. The non-transitory computer-readable media of claim 13, wherein the computer-executable instructions further cause the computing system to store the data object in a local cache of the computing system, the local cache representing a level one cache and the set of cache devices representing at least part of a level two cache.

15. The non-transitory computer-readable media of claim 13, wherein the computer-executable instructions further cause the computing system to:

identify at least one erasure coded part of the set of erasure coded parts that is not stored within the cache device of the set of cache devices that is assigned to store the at least one erasure coded part;

erasure code the data object to result in the at least one erasure coded part; and store the at least one erasure coded part in the cache device.

16. The non-transitory computer-readable media of claim 13, wherein the computer-executable instructions cause the computing system to initiate retrieval of the second data object from the origin location for the second data object while at least one request to a cache device of the second set of cache devices for an erasure coded part, of the second set of erasure coded parts, is outstanding.

17. The non-transitory computer-readable media of claim 13, wherein the computer-executable instructions further cause the computing system to:

erasure code the data object into the set of erasure coded parts;

determine one or more erasure coded parts, of the set of erasure coded parts, not stored on the set of cache devices; and for each erasure coded part, of the set of erasure coded parts, determined not to be stored by the set of cache devices, store the erasure coded part at the set of cache devices.

18. The non-transitory computer-readable media of claim 13, wherein the set of cache devices are arranged into a consistent hash ring comprising a plurality of cache devices, and wherein to identify the set of cache devices assigned to store the set of erasure coded parts, the computer-executable instructions cause the computing system to:

determine a hash value for the data object; and identify the set of cache devices based at least on the hash value for the object and locations of the set of cache devices on the consistent hash ring.

19. The non-transitory computer-readable media of claim 13, wherein to request the set of erasure coded parts from the set of cache devices, the computer-executable instructions cause the computing system to:

request a subset of the set of erasure coded parts from the cache devices, of the set of cache devices, expected to store the subset;

detect that at least one response from the cache devices has not been received in a threshold period of time; and request a remainder of the set of erasure coded parts from remaining cache devices of the set of cache devices.

\* \* \* \* \*